(12) United States Patent
Brueggen

(10) Patent No.: US 7,817,653 B2
(45) Date of Patent: Oct. 19, 2010

(54) PRIORITY SELECTION CIRCUIT

(75) Inventor: Chris Michael Brueggen, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 11/737,360

(22) Filed: Apr. 19, 2007

(65) Prior Publication Data
US 2008/0263239 A1    Oct. 23, 2008

(51) Int. Cl.
| | |
|---|---|
| H04L 12/28 | (2006.01) |
| H04L 12/56 | (2006.01) |
| G01R 31/08 | (2006.01) |
| G06F 11/00 | (2006.01) |
| G06F 15/16 | (2006.01) |
| G06F 12/00 | (2006.01) |
| G06F 13/14 | (2006.01) |
| G06F 13/38 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/50 | (2006.01) |
| H04Q 11/00 | (2006.01) |

(52) U.S. Cl. .................. 370/412; 370/230; 370/386; 709/229; 710/244

(58) Field of Classification Search .................. 370/412
See application file for complete search history.

(56) References Cited

U.S. PATENT DOCUMENTS

| 5,835,491 | A  | * | 11/1998 | Davis et al. .................. 370/386 |
| 6,744,728 | B1 | * | 6/2004  | Chung ......................... 370/229 |
| 6,912,225 | B1 | * | 6/2005  | Kohzuki et al. ............. 370/412 |
| 7,263,097 | B1 | * | 8/2007  | Ornes et al. ................. 370/386 |
| 7,623,519 | B2 | * | 11/2009 | Tornetta et al. ............. 370/392 |
| 2002/0085578 | A1 | * | 7/2002 | Dell et al. .................... 370/422 |
| 2008/0159145 | A1 | * | 7/2008 | Muthukrishnan et al. ... 370/235 |

* cited by examiner

*Primary Examiner*—William Trost, IV
*Assistant Examiner*—Andrew Chriss

(57) ABSTRACT

A circuit includes a first selection module having first data input, second data input, first validation input, second validation input, selected data output, marker output, and presence output. A first validation signal received at the first validation input identifies whether or not a first data signal received at the first data input is valid; a second validation signal received at the second validation input identifies whether or not a second data signal received at the second data input is valid; a presence signal outputted at the presence output identifies whether or not at least one data signal is valid; and the first data input has an assigned selection priority higher than that assigned to the second data input. If at least one data signal is identified as valid, the valid data signal having the higher assigned priority is transferred to the selected data output.

17 Claims, 8 Drawing Sheets

PRIORITY SELECTION CIRCUIT

BACKGROUND

In some digital communication systems, multiple valid data inputs are at times received simultaneously. In such instances, the system may need to select only one of these data inputs and reject the others based on a preselected priority scheme. This situation has been previously managed by first encoding the valid inputs according to the priority scheme, and then using that encoded value as an input to a multiplexer. This technique is basically a two stage process, first obtaining the priority signal by encoding the received data inputs using the preselected priority scheme and then using that priority signal to select the data input having the highest priority.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
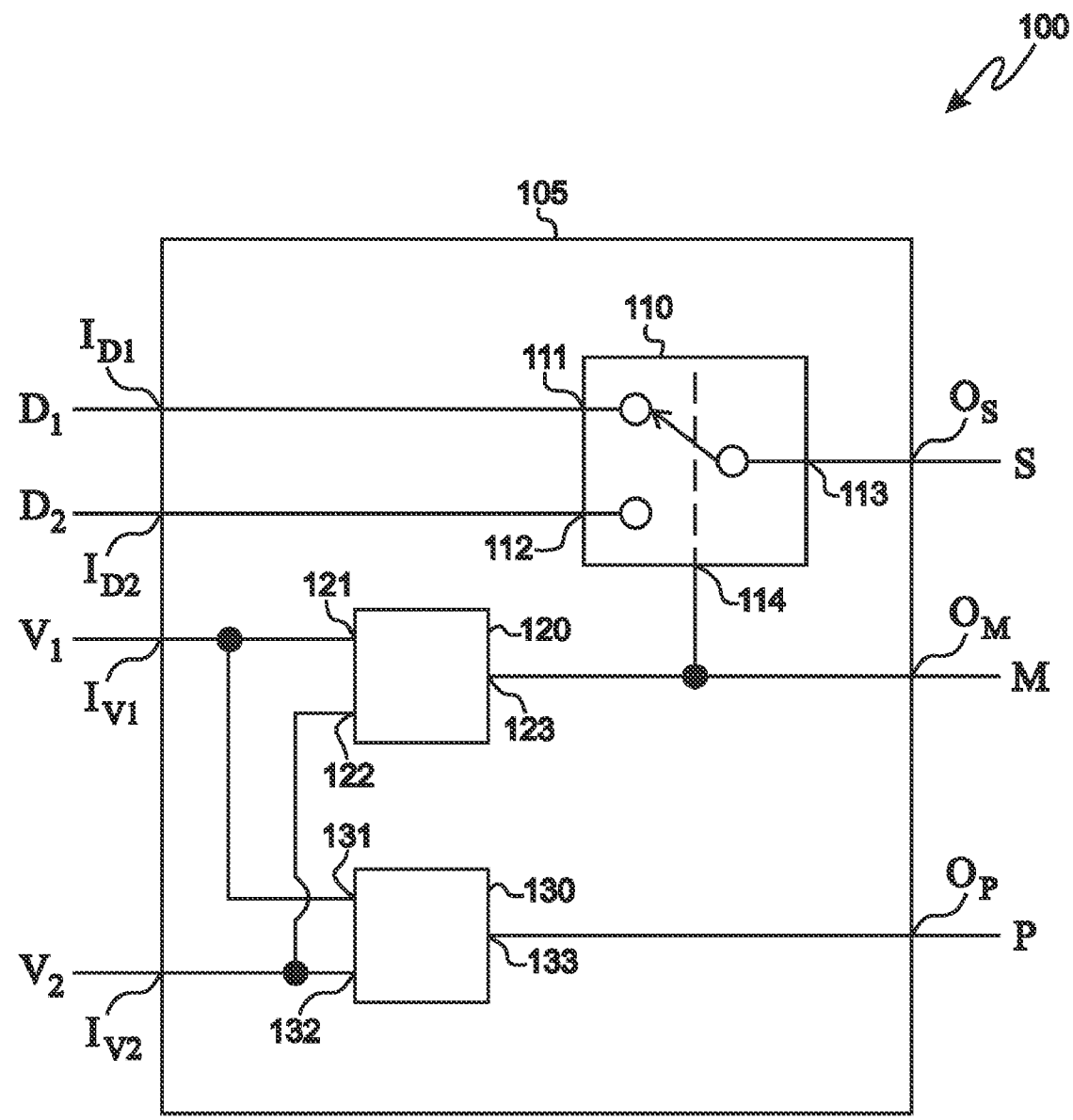
FIG. 1 is a drawing of a block diagram of a data selection circuit as described in various representative embodiments.

As shown in the drawings for purposes of illustration, a novel technique is disclosed herein for the selection of one data input from multiple valid data inputs based on a preselected priority scheme. These techniques simultaneously prioritize and select the data input. Previous techniques have performed these two functions serially, first obtaining a priority signal from the valid inputs and then using that signal to select the data input having the highest priority. As such, previous techniques have longer propagation delays than do the techniques disclosed herein.

In the following detailed description and in the several figures of the drawings, like elements are identified with like reference numerals.

FIG. 1 is a drawing of a block diagram of a data selection circuit 100 as described in various representative embodiments. In the representative embodiment of FIG. 1, the data selection circuit 100, which may also be referred to herein as circuit 100, comprises a selection module 105. The selection module 105 comprises a switch 110, a switch control module 120, and a detection module 130. The switch 110 has a first switch input 111, a second switch input 112, a switch output 113, and a switch control input 114. The switch control module 120 has a first switch-control-module input 121, a second switch-control-module input 122, and a switch-control-module output 123. The detection module 130 has a first detection-module input 131, a second detection-module input 132, and a detection-module output 133.

The first switch input 111 is coupled to a first data input $I_{D1}$ where it is configured to receive a first data signal $D_1$. The second switch input 112 is coupled to a second data input $I_{D2}$ where it is configured to receive a second data signal $D_2$. The first switch-control-module input 121 is coupled to a first validation input $I_{V1}$ where it is configured to receive a first validation signal $V_1$. And, the second switch-control-module input 122 is coupled to a second validation input $I_{V2}$ where it is configured to receive a second validation signal $V_2$. The first switch-control-module input 121 is internally coupled to the first detection-module input 131. The second switch-control-module input 122 is internally coupled to the second detection-module input 132. And, the switch-control-module output 123 is internally coupled to the switch control input 114.

The switch output 113 is coupled to a selected data output $O_S$ where the selection module 105 outputs as appropriate a selected signal S. The switch-control-module output 123 and the internally coupled switch control input 114 are coupled to a marker output $O_M$ where the selection module 105 outputs as appropriate a marker signal M. The detection-module output 133 is coupled to a presence output $O_P$ where the selection module 105 outputs as appropriate a presence signal P.

In operation, the first validation signal $V_1$ received at the first validation input $I_{V1}$ identifies whether or not the first data signal $D_1$ received at the first data input $I_{D1}$ is valid. The second validation signal $V_2$ received at the second validation input $I_{V2}$ identifies whether or not the second data signal $D_2$ received at the second data input $I_{D2}$ is valid. The presence signal P outputted at the presence output $O_P$ identifies whether or not at least one data signal $D_1,D_2$ is valid. In this representative embodiment, the first data input $I_{D1}$ has an assigned selection priority higher than that assigned to the second data input $I_{D2}$. If at least one data signal $D_1,D_2$ is identified as valid, the valid data signal $D_1,D_2$ having the higher assigned priority is transferred to the selected data output $O_S$. And, the marker signal M at the marker output $O_M$ identifies from which data input $I_{D1},I_{D2}$ the transferred data signal $D_1,D_2$ was transferred. In the representative embodiment of FIG. 1, the selection module 105 is configured such that a valid first data signal $D_1$ received at the first data input $I_{D1}$ has a higher priority than a valid second data signal $D_2$ received at the second data input $I_{D2}$.

Figure 2:
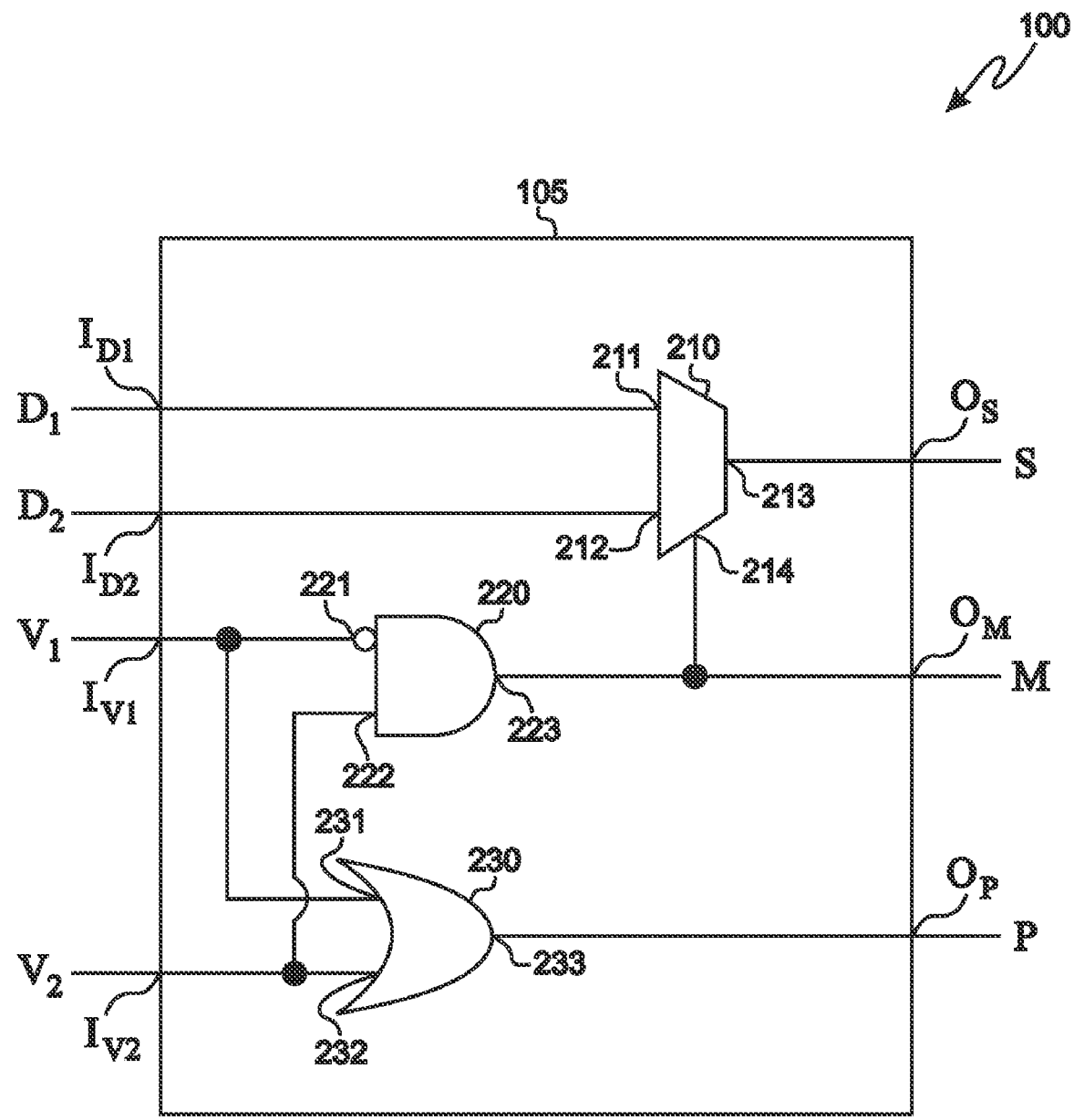
FIG. 2 is a drawing of a circuit diagram of another data selection circuit as described in various representative embodiments.

FIG. 2 is a drawing of a circuit diagram of another data selection circuit 100 as described in various representative embodiments. In the representative embodiment of FIG. 2, the switch 110 of FIG. 1 is replaced by a selection multiplexer 210, the switch control module 120 is replaced by a modified AND-gate 220, and the detection module 130 is replaced by an OR-gate 230. The selection multiplexer 210 has a first selection-multiplexer input 211, a second selection-multiplexer input 212, a selection-multiplexer output 213, and a selection-multiplexer control input 214. The modified AND-gate 220 has a first modified-AND-gate input 221, second modified-AND-gate input 222, and a modified-AND-gate output 223. The OR-gate 230 has a first OR-gate input 231, a second OR-gate input 232, and an OR-gate output 233.

The first selection-multiplexer input 211 is coupled to the first data input $I_{D1}$ where it is configured to receive a first data signal $D_1$. The second selection-multiplexer input 212 is coupled to a second data input $I_{D2}$ where it is configured to receive a second data signal $I_{D2}$. The first modified-AND-gate input 221 is coupled to a first validation input $I_{V1}$ where it is configured to receive a first validation signal $V_1$. And, the second modified-AND-gate input 222 is coupled to a second validation input $I_{V2}$ where it is configured to receive a second validation signal $V_2$. The first modified-AND-gate input 221 is internally coupled to the first OR-gate input 231. The second modified-AND-gate input 222 is internally coupled to the second OR-gate input 232. And, the modified-AND-gate output 223 is internally coupled to the selection-multiplexer control input 214.

The selection-multiplexer output 213 is coupled to the selected data output $O_S$ where the selection module 105 outputs as appropriate a selected signal S. The modified-AND-gate output 223 and the internally coupled selection-multiplexer control input 214 are coupled to a marker output $O_M$ where the selection module 105 outputs as appropriate a marker signal M. The OR-gate output 233 is coupled to a presence output $O_P$ where the selection module 105 outputs as appropriate a presence signal P.

As in FIG. 1, in operation, the first validation signal $V_1$ received at the first validation input $I_{V1}$ identifies whether or not the first data signal $D_1$ received at the first data input $I_{D1}$ is valid. The second validation signal $V_2$ received at the second validation input $I_{V2}$ identifies whether or not the second data signal $D_2$ received at the second data input $I_{D2}$ is valid. The presence signal P outputted at the presence output $O_P$ identifies whether or not at least one data signal $D_1, D_2$ is valid. In this representative embodiment, the first data input $I_{D1}$ has an assigned selection priority higher than that assigned to the second data input $I_{D2}$. If at least one data signal $D_1, D_2$ is identified as valid, the valid data signal $D_1, D_2$ having the higher assigned priority is transferred to the selected data output $O_S$. And, the marker signal M at the marker output $O_M$ identifies from which data input $I_{D1}, I_{D2}$ the transferred data signal $D_1, D_2$ was transferred. By virtue of the configuration of the components in FIG. 2, a valid first data signal $D_1$ received at the first data input $I_{D1}$ has a higher priority than a valid second data signal $D_2$ received at the second data input $I_{D2}$.

Table 1 is a truth table for the selection modules 105 of FIGS. 1 and 2. In the first data row of Table 1, the first validation signal $V_1$ is a logic "1" indicating that the first data signal $D_1$ at the first data input $I_{D1}$ is valid, and the second validation signal $V_2$ is a logic "1" indicating that the second data signal $D_2$ at the second data input $I_{D2}$ is valid. The value at the modified-AND-gate output 223 is then a logic "0", i.e., the marker signal M at the marker output $O_M$ is a logic "0", which is applied to the selection-multiplexer control input 214 and thereby forces the selection multiplexer 210 to couple the first selection-multiplexer input 211 to the selection-multiplexer output 213. Thus, the valid first data signal $D_1$ at the first data input $I_{D1}$ is transferred to the selection-multiplexer output 213 where it appears as the selected signal S at the selected data output $O_S$. In addition, the presence signal P at the presence output $O_P$, i.e., the OR-gate output 233, will be a logic "1" indicating that the selected signal S at the selected data output $O_S$ is valid.

In the second data row of Table 1, the first validation signal $V_1$ is a logic "1" indicating that the first data signal $D_1$ at the first data input $I_{D1}$ is valid, and the second validation signal $V_2$ is a logic "0" indicating that the second data signal $D_2$ at the second data input $I_{D2}$ is invalid. The value at the modified-AND-gate output 223 is then a logic "0", i.e., the marker signal M at the marker output $O_M$ is a logic "0", which is applied to the selection-multiplexer control input 214 and thereby forces the selection multiplexer 210 to couple the first selection-multiplexer input 211 to the selection-multiplexer output 213. Thus, the valid first data signal $D_1$ at the first data input $I_{D1}$ is transferred to the selection-multiplexer output 213 where it appears as the selected signal S at the selected data output $O_S$. In addition, the presence signal P at the presence output $O_P$, i.e., the OR-gate output 233, will be a logic "1" indicating that the selected signal S at the selected data output $O_S$ is valid.

In the third data row of Table 1, the first validation signal $V_1$ is a logic "0" indicating that the first data signal $D_1$ at the first data input $I_{D1}$ is invalid, and the second validation signal $V_2$ is a logic "1" indicating that the second data signal $D_2$ at the second data input $I_{D2}$ is valid. The value at the modified-AND-gate output 223 is then a logic "1", i.e., the marker signal M at the marker output $O_M$ is a logic "1", which is applied to the selection-multiplexer control input 214 and thereby forces the selection multiplexer 210 to couple the second selection-multiplexer input 212 to the selection-multiplexer output 213. Thus, the valid second data signal $D_2$ at the second data input $I_{D2}$ is transferred to the selection-multiplexer output 213 where it appears as the selected signal S at the selected data output $O_S$. In addition, the presence signal P at the presence output $O_P$, i.e., the OR-gate output 233, will be a logic "1" indicating that the selected signal S at the selected data output $O_S$ is valid.

TABLE 1

| Row | $V_1$ | $V_2$ | $S_1$ | $M_1$ | $P_1$ | Interpretation |
|---|---|---|---|---|---|---|
| 1 | 1 | 1 | $D_1$ ($I_{D1}$) | 0 | 1 | First data signal $D_1$ at first data input $I_{D1}$ valid, and Second data signal $D_2$ at second data input $I_{D2}$ valid. First data signal $D_1$ at first data input $I_{D1}$ selected. |
| 2 | 1 | 0 | $D_1$ ($I_{D1}$) | 0 | 1 | First data signal $D_1$ at first data input $I_{D1}$ valid, and Second data signal $D_2$ at second data input $I_{D2}$ invalid. First data signal $D_1$ at first data input $I_{D1}$ selected. |
| 3 | 0 | 1 | $D_2$ ($I_{D2}$) | 1 | 1 | First data signal $D_1$ at first data input $I_{D1}$ invalid, and Second data signal $D_2$ at second data input $I_{D2}$ valid. Second data signal $D_2$ at second data input $I_{D2}$ selected. |
| 4 | 0 | 0 | D1 ($I_{D1}$) | 0 | 0 | First data signal $D_1$ at first data input $I_{D1}$ invalid, and Second data signal $D_2$ at second data input $I_{D2}$ invalid. Invalid first data $D_1$ at first data input $I_{D1}$ selected. |

In the fourth data row of Table 1, the first validation signal $V_1$ is a logic "0" indicating that the first data signal $D_1$ at the first data input $I_{D1}$ is invalid, and the second validation signal $V_2$ is a logic "0" indicating that the second data signal $D_2$ at the second data input $I_{D2}$ is also invalid. The value at the modified-AND-gate output 223 is then a logic "0", i.e., the marker signal M at the marker output $O_M$ is a logic "0", which is applied to the selection-multiplexer control input 214 and thereby forces the selection multiplexer 210 to couple the first selection-multiplexer input 211 to the selection-multiplexer output 213. Thus, the invalid second data signal $D_1$ at the first data input $I_{D1}$ is transferred to the selection-multiplexer output 213 where it appears as the selected signal S at the selected data output $O_S$. However, the presence signal P at the presence output $O_P$, i.e., the OR-gate output 233, will be a logic "0" indicating that the selected signal S at the selected data output $O_S$ is invalid.

Figure 3:
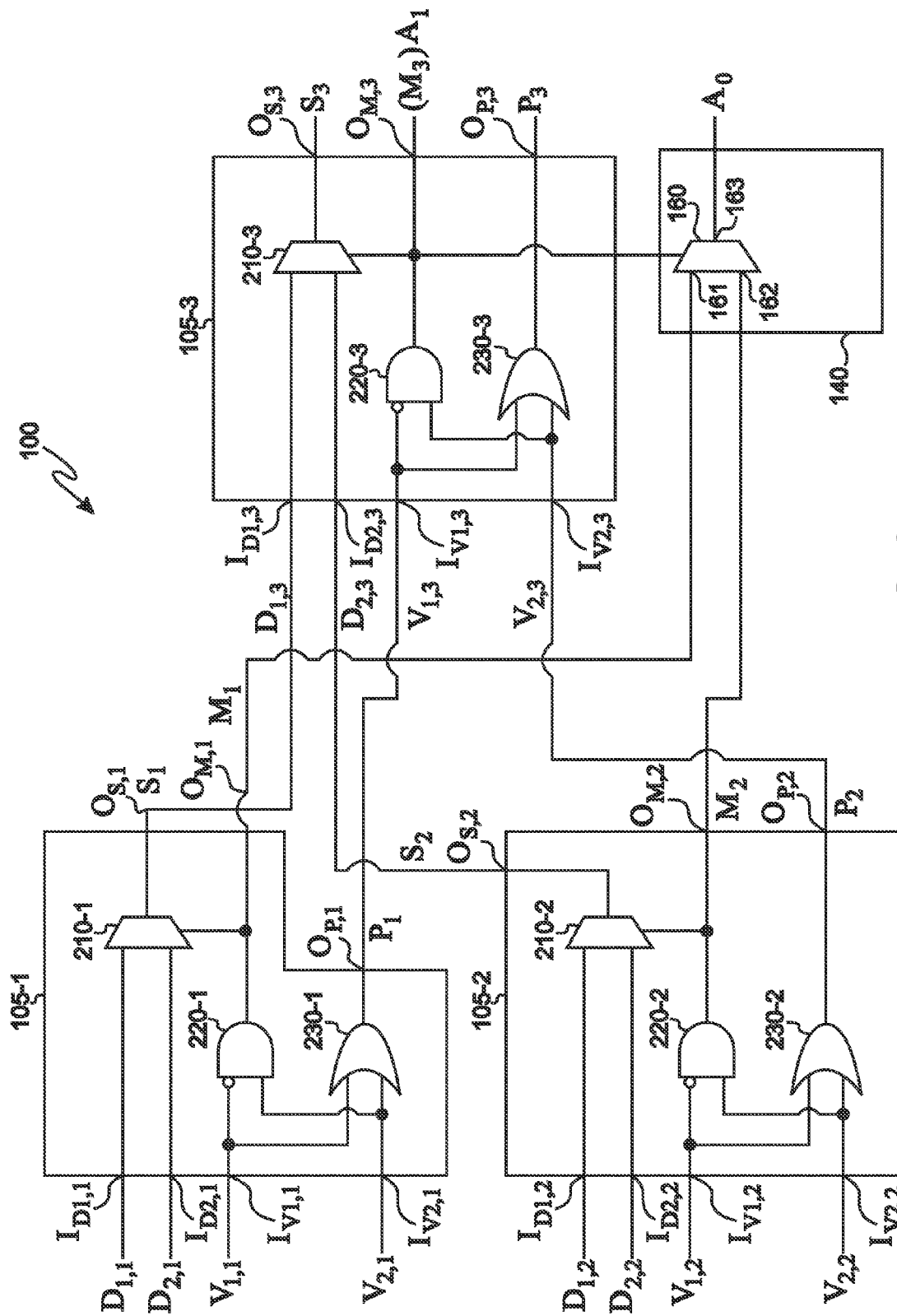
FIG. 3 is a drawing of a circuit diagram of still another data selection circuit as described in various representative embodiments.

FIG. 3 is a drawing of a circuit diagram of still another data selection circuit 100 as described in various representative embodiments. In the representative embodiment of FIG. 3, the data selection circuit 100 comprises three selection modules 105 identified in the figure as first selection module 105-1, second selection module 105-2, and third selection module 105-3. The first selection module 105-1, the second selection module 105-2, and the third selection module 105-3 are configured the same as the selection module 105 of FIG. 2. In an alternative embodiment, the first selection module 105-1, the second selection module 105-2, and the third selection module 105-3 are configured the same as the selection module 105 of FIG. 1. In FIG. 3 for either embodiment, the selected data output $O_S$ of the first selection module 105-1 is coupled to the first data input $I_{D1,3}$ of the third selection module 105-3; the selected data output $O_{S,2}$ of the second selection module 105-2 is coupled to the second data input $I_{D2,3}$ of the third selection module 105-3; the presence output $O_{P,1}$ of the first selection module 105-1 is coupled to the first validation input $I_{V1,3}$ of the third selection module 105-3; and the presence output $O_{P,2}$ of the second selection module 105-2 is coupled to the second validation input $I_{V2,3}$ of the third selection module 105-3.

As in FIG. 2, each of the selection modules 105-1, 105-2, 105-3 in FIG. 3 comprises a selection multiplexer 210, a modified AND-gate 220, and an OR-gate 230 internally coupled as in FIG. 2 and as also shown in FIG. 3. In FIG. 3, the selection multiplexer 210 for the first selection module 105-1 is indicated as selection multiplexer 210-1, for the second selection module 105-2 is indicated as selection multiplexer 210-2, and for the third selection module 105-3 is indicated as selection multiplexer 210-3. The modified AND-gate 220 for the first selection module 105-1 is indicated as modified AND-gate 220-1, for the second selection module 105-2 is indicated as modified AND-gate 220-2, and for the third selection module 105-3 is indicated as modified AND-gate 220-3. The OR-gate 230 for the first selection module 105-1 is indicated as selection multiplexer 230-1, for the second selection module 105-2 is indicated as OR-gate 230-2, and for the third selection module 105-3 is indicated as OR-gate 230-3.

In operation, as in FIGS. 1 and 2, the first validation signal $V_{1,1}$ received at the first validation input $I_{V1,1}$ of the first selection module 105-1 identifies whether or not the first data signal $D_{1,1}$ received at the first data input $I_{D1,1}$ of the first selection module 105-1 is valid. The second validation signal $V_{2,1}$ received at the second validation input $I_{V2,1}$ of the first selection module 105-1 identifies whether or not the second data signal $D_{2,1}$ received at the second data input $I_{D2,1}$ of the first selection module 105-1 is valid. The presence signal $P_1$ outputted at the presence output $O_{P,1}$ of the first selection module 105-1 identifies whether or not at least one data signal $D_{1,1},D_{2,1}$ of the first selection module 105-1 is valid. In this representative embodiment, the first data input $I_{D1,1}$ of the first selection module 105-1 has an assigned selection priority higher than that assigned to the second data input $I_{D2,1}$ of the first selection module 105-1. If at least one data signal $D_{1,1},D_{2,1}$ of the first selection module 105-1 is identified as valid, the valid data signal $D_{1,1},D_{2,1}$ of the first selection module 105-1 having the higher assigned priority is transferred to the selected data output $O_S$ of the first selection module 105-1. And, the marker signal $M_1$ at the marker output $O_{M,1}$ of the first selection module 105-1 identifies from which data input $I_{D1,1},I_{D2,1}$ of the first selection module 105-1 the transferred data signal $D_{1,1},D_{2,1}$ of the first selection module 105-1 was transferred. As in the representative embodiments of FIGS. 1 and 2, the first selection module 105-1 is configured such that a valid first data signal $D_{1,1}$ received at the first data input $I_{D1,1}$ of the first selection module 105-1 has a higher priority than a valid second data signal $D_{2,1}$ received at the second data input $I_{D2,1}$ of the first selection module 105-1.

In a similar manner, the first validation signal $V_{1,2}$ received at the first validation input $I_{V1,2}$ of the second selection module 105-2 identifies whether or not the first data signal $D_{1,2}$ received at the first data input $I_{D1,2}$ of the second selection module 105-2 is valid. The second validation signal $V_{2,2}$ received at the second validation input $I_{V2,2}$ of the second selection module 105-2 identifies whether or not the second data signal $D_{2,2}$ received at the second data input $I_{D2,2}$ of the second selection module 105-2 is valid. The presence signal $P_2$ outputted at the presence output $O_{P,2}$ of the second selection module 105-2 identifies whether or not at least one data signal $D_{1,2},D_{2,2}$ of the second selection module 105-2 is valid. In this representative embodiment, the first data input $I_{D1,2}$ of the second selection module 105-2 has an assigned selection priority higher than that assigned to the second data input $I_{D2,2}$ of the second selection module 105-2. If at least one data signal $D_{1,2},D_{2,2}$ of the second selection module 105-2 is identified as valid, the valid data signal $D_{1,2},D_{2,2}$ of the second selection module 105-2 having the higher assigned priority is transferred to the selected data output $O_{S,2}$ of the second selection module 105-2. And, the marker signal $M_2$ at the marker output $O_{M,2}$ of the second selection module 105-2 identifies from which data input $I_{D1,2},I_{D2,2}$ the transferred data signal $D_{1,2},D_{2,2}$ of the second selection module 105-2 was transferred. As in the representative embodiments of FIGS. 1 and 2, the second selection module 105-2 is configured such that a valid first data signal $D_{1,2}$ received at the first data input $I_{D1,2}$ of the second selection module 105-2 has a higher priority than a valid second data signal $D_{2,2}$ received at the second data input $I_{D2,2}$ of the second selection module 105-2.

And, the first validation signal $V_{1,3}$ received at the first validation input $I_{V1,3}$ of the third selection module 105-3 identifies whether or not the first data signal $D_{1,3}$ received at the first data input $I_{D1,3}$ of the third selection module 105-3 is valid. The second validation signal $V_{2,3}$ received at the second validation input $I_{V2,3}$ of the third selection module 105-3 identifies whether or not the second data signal $D_{2,3}$ received at the second data input $I_{D2,3}$ of the third selection module 105-3 is valid. The presence signal $P_3$ outputted at the presence output $O_{P,3}$ of the third selection module 105-3 identifies whether or not at least one data signal $D_{1,3},D_{2,3}$ of the third selection module 105-3 is valid. In this representative embodiment, the first data input $I_{D1,3}$ of the third selection module 105-3 has an assigned selection priority higher than that assigned to the second data input $I_{D2,3}$ of the third selection module 105-3. If at least one data signal $D_{1,3},D_{2,3}$ of the third selection module 105-3 is identified as valid, the valid data signal $D_{1,3},D_{2,3}$ of the third selection module 105-3 having the higher assigned priority is transferred to the selected data output $O_{S,3}$ of the third selection module 105-3. And, the marker signal $M_3$ at the marker output $O_{M,3}$ of the third selection module 105-3 identifies from which data input $I_{D1,3}, I_{D2,3}$ the transferred data signal $D_{1,3}, D_{2,3}$ of the third selection module 105-3 was transferred. As in the representative embodiments of FIGS. 1 and 2, the third selection module 105-3 is configured such that a valid first data signal $D_{1,3}$ received at the first data input $I_{D1,3}$ of the third selection module 105-3 has a higher priority than a valid second data signal $D_{2,3}$ received at the second data input $I_{D2,3}$ of the third selection module 105-3.

It follows from the above discussion, that a valid first data signal $D_{1,1}$ received at the first data input $I_{D1,1}$ of the first selection module 105-1 has a higher priority than a valid second data signal $D_{2,1}$ received at the second data input $I_{D2,1}$ of the first selection module 105-1, that a valid second data signal $D_{2,1}$ received at the second data input $I_{D2,1}$ of the first selection module 105-1 has a higher priority than a valid first data signal $D_{1,2}$ received at the first data input $I_{D1,2}$ of the second selection module 105-2, and that a valid first data signal $D_{1,2}$ received at the first data input $I_{D1,2}$ of the second selection module 105-2 has a higher priority than a valid second data signal $D_{2,2}$ received at the second data input $I_{D2,2}$ of the second selection module 105-2.

The data selection circuit 100 of FIG. 3 further comprises an address module 140. The address module comprises a first address multiplexer 160 having a first first-address-multiplexer input 161, a second first-address-multiplexer input 162, a first-address-multiplexer output 163, and a first-address-multiplexer control input 164. The first first-address-multiplexer input 161 is coupled to the marker signal $M_1$ at the marker output $O_{M,1}$ of the first selection module 105-1, the second first-address-multiplexer input 162 is coupled to the marker signal $M_2$ at the marker output $O_{M,2}$ of the second selection module 105-2, and the first-address-multiplexer control input 164 is coupled to the marker signal $M_3$ at the marker output $O_{M,3}$ of the third selection module 105-3.

The data signal $D_{1,1}, D_{2,1}, D_{1,2}, D_{2,2}$ of whichever of the data inputs $I_{D1,1}, I_{D2,1}, I_{D1,2}, I_{D2,2}$ of the first and second selection modules 105-1, 105-2 that has the higher priority will be transferred to the selected data output $O_{S,3}$ of the third selection module 105-3 as the selected signal $S_3$. The presence signal $P_3$ at the presence output $O_{P,3}$ of the third selection module 105-3 indicates whether or not at least one of the data signals $D_{1,1}, D_{2,1}, D_{1,2}, D_{2,2}$ of the first and second selection modules 105-1, 105-2 transferred to the selected data output $O_{S,3}$ of the third selection module 105-3 as the selected signal $S_3$ is valid. The marker signal $M_3$ at the marker output $O_{M,3}$ of the third selection module 105-3 identifies from which data input $I_{D1,3}, I_{D2,3}$ of the third selection module 105-3 the transferred data signal $D_{1,1}, D_{2,1}, D_{1,2}, D_{2,2}$ of the first and second selection modules 105-1, 105-2 was transferred. Thus, the marker signal $M_3$ at the marker output $O_{M,3}$ of the third selection module 105-3 is the first (higher) order bit-address $A_1$ (see Table 2) of the selected data input $I_{D1,1}, I_{D2,1}, I_{D1,2}, I_{D2,2}$. The value of the first-address-multiplexer output 163 is the zero (lowest) order bit-address $A_0$ (see Table 2) of the selected data input $I_{D1,1}, I_{D2,1}, I_{D1,2}, I_{D2,2}$ of the first and second selection modules 105-1, 105-2.

Table 2 is a truth table for the data selection circuit 100 of FIG. 3. As an example, in the first data row of Table 1, the first and second validation signals $V_{1,1}, V_{2,1}$ of the first selection module 105-1 and the first and second validation signals $V_{1,2}, V_{2,2}$ of the second selection module 105-2 are all a logic "1" indicating that the first data signal $D_{1,1}$ at the first data input $I_{D1,1}$ of the first selection module 105-1, the second data signal $D_{2,1}$ at the second data input $I_{D2,1}$ of the first selection module 105-1, the first data signal $D_{1,2}$ at the second data input $I_{D1,2}$ of the second selection module 105-2, and the second data signal $D_{2,2}$ at the second data input $I_{D2,2}$ of the second selection module 105-2 are all valid. For the first selection module 105-1, the selected signal $S_1$ at the selected data output $O_{S,1}$ of the first selection module 105-1 is the first data signal $D_{1,1}$ of the first selection module 105-1; the marker signal $M_1$ at the marker output $O_{M,1}$ of the first selection module 105-1 is a logic "0", and the presence signal $P_1$ at the presence output $O_{P,1}$ of the first selection module 105-1 is a logic "1". For the second selection module 105-2, the selected signal $S_2$ at the selected data output $O_{S,2}$ of the second selection module 105-2 is the first data signal $D_{1,2}$ of the second selection module 105-2; the marker signal $M_2$ at the marker output $O_{M,2}$ of the second selection module 105-2 is a logic "0", and the presence signal $P_1$ at the presence output $O_{P,2}$ of the second selection module 105-2 is a logic "1". For the third selection module 105-3, the selected signal $S_3$ at the selected data output $O_{S,3}$ of the third selection module 105-3 is the first data signal $D_{1,1}$ of the first selection module 105-1; the marker signal $M_3$ at the marker output $O_{M,3}$ of the third selection module 105-3 is a logic "0", and the presence signal $P_3$ at the presence output $O_{P,3}$ of the third selection module 105-3 is a logic "1" indicating that the selected signal $S_3$ at the selected data output $O_{S,3}$ of the third selection module 105-3 is valid.

Thus, with valid data present at the first and the second data inputs $I_{D1,1}, I_{D2,1}$ of the first selection module 105-1 and at the first and the second data inputs $I_{D1,2}, I_{D2,2}$ of the second selection module 105-2, the first data signal $D_{1,1}$ of the first selection module 105-1 is selected as the highest priority input signal and thus outputted as the selected signal $S_3$ at the selected data output $O_{S,3}$ of the third selection module 105-3. Also, the first (higher) order bit-address $A_1$ of the selected data input $I_{D1,1}, I_{D2,1}, I_{D1,2}, I_{D2,2}$, which as indicated above is the marker signal $M_3$ at the marker output $O_{M,3}$ of the third selection module 105-3, is "0", and the value of the zero (lowest) order bit-address $A_0$ of the selected data input $I_{D1,1}, I_{D2,1}, I_{D1,2}, I_{D2,2}$, which as indicated above is the first-address-multiplexer output 163, is "0".

As shown in rows 1-8 of Table 2, if the first data signal $D_{1,1}$ of the first selection module 105-1 is valid, the data selection circuit 100 of FIG. 3 will select the first data signal $D_{1,1}$ of the first selection module 105-1 to output as the selected signal $S_3$ at the selected data output $O_{S,3}$ of the third selection module 105-3 regardless of whether or not the remaining data signals $D_{2,1}, D_{1,2}, D_{2,2}$ are valid. Also, as shown in rows 9-12 of Table 2, if the first data signal $D_{1,1}$ of the first selection module 105-1 is invalid and the second data signal $D_{2,1}$ of the first selection module 105-1 is valid, the data selection circuit 100 of FIG. 3 will select the second data signal $D_{2,1}$ of the first selection module 105-1 to output as the selected signal $S_3$ at the selected data output $O_{S,3}$ of the third selection module 105-3 regardless of whether or not the remaining data signals $D_{1,2}, D_{2,2}$ are valid. And, as shown in rows 13-14 of Table 2, if the first data signal $D_{1,1}$ of the first selection module 105-1 is invalid, the second data signal $D_{2,1}$ of the first selection module 105-1 is invalid, and the first data signal $D_{1,2}$ of the second selection module 105-2 is valid, the data selection circuit 100 of FIG. 3 will select the first data signal $D_{1,2}$ of the second selection module 105-2 to output as the selected signal $S_3$ at the selected data output $O_{S,3}$ of the third selection module 105-3 regardless of whether or not the remaining data signal $D_{2,2}$ is valid. Further, as shown in row 15 of Table 2, if the first data signal $D_{1,1}$ of the first selection module 105-1 is invalid, the second data signal $D_{2,1}$ of the first selection module 105-1 is invalid, the first data signal $D_{1,2}$ of the second selection module 105-2 is invalid, and the second data signal $D_{2,2}$ of the second selection module 105-2 is valid, the data selection circuit 100 of FIG. 3 will select the second data signal $D_{2,2}$ of the second selection module 105-2 to output as the selected signal $S_3$ at the selected data output $O_{S,3}$ of the third selection module 105-3. And further, as shown in row 16 of Table 2, if the first data signal $D_{1,1}$ of the first selection module 105-1 is invalid, the second data signal $D_{2,1}$ of the first selection module 105-1 is invalid, the first data signal $D_{1,1}$ of the second selection module 105-2 is invalid, and the second data signal $D_{2,2}$ of the second selection module 105-2 is invalid, the data selection circuit 100 of FIG. 3 will select the first data signal $D_{1,1}$ of the first selection module 105-1 to output as the selected signal $S_3$ at the selected data output $O_{S,3}$ of the third selection module 105-3. However, in this last case, the presence signal $P_3$ at the presence output $O_{P,3}$ of the third selection module 105-3 is a logic "0" indicating that the selected signal $S_3$ at the selected data output $O_{S,3}$ of the third selection module 105-3 is invalid.

105-4 is indicated as selection multiplexer 210-4, for the fifth selection module 105-5 is indicated as selection multiplexer 210-5, and for the sixth selection module 105-6 is indicated as selection multiplexer 210-6. The modified AND-gate 220 for the fourth selection module 105-4 is indicated as modified AND-gate 220-4, for the fifth selection module 105-5 is indicated as modified AND-gate 220-5, and for the sixth selection module 105-6 is indicated as modified AND-gate 220-6. The OR-gate 230 for the fourth selection module 105-4 is indicated as selection multiplexer 230-4, for the fifth selection module 105-5 is indicated as OR-gate 230-5, and for the sixth selection module 105-6 is indicated as OR-gate 230-6.

In operation, as in FIGS. 1 and 2, the first validation signal $V_{1,4}$ received at the first validation input $I_{V1,4}$ of the fourth selection module 105-4 identifies whether or not the first data signal $D_{1,4}$ received at the first data input $I_{D1,4}$ of the fourth selection module 105-4 is valid. The second validation signal $V_{2,4}$ received at the second validation input $I_{V2,4}$ of the fourth selection module 105-4 identifies whether or not the second

TABLE 2

| Row | $V_{1,1}$ | $V_{2,1}$ | $V_{1,2}$ | $V_{2,2}$ | $S_1$ | $M_1$ | $P_1$ | $S_2$ | $M_2$ | $P_2$ | $S_3$ | $M_3$ | $P_3$ | $A_1$ | $A_0$ |
|---|---|---|---|---|---|---|---|---|---|---|---|---|---|---|---|
| 1 | 1 | 1 | 1 | 1 | $D_{1,1}$ | 0 | 1 | $D_{1,2}$ | 0 | 1 | $D_{1,1}$ | 0 | 1 | 0 | 0 |
| 2 | 1 | 1 | 1 | 0 | $D_{1,1}$ | 0 | 1 | $D_{1,2}$ | 0 | 1 | $D_{1,1}$ | 0 | 1 | 0 | 0 |
| 3 | 1 | 1 | 0 | 1 | $D_{1,1}$ | 0 | 1 | $D_{2,2}$ | 1 | 1 | $D_{1,1}$ | 0 | 1 | 0 | 0 |
| 4 | 1 | 1 | 0 | 0 | $D_{1,1}$ | 0 | 1 | $D_{1,2}$ | 0 | 0 | $D_{1,1}$ | 0 | 1 | 0 | 0 |
| 5 | 1 | 0 | 1 | 1 | $D_{1,1}$ | 0 | 1 | $D_{1,2}$ | 0 | 1 | $D_{1,1}$ | 0 | 1 | 0 | 0 |
| 6 | 1 | 0 | 1 | 0 | $D_{1,1}$ | 0 | 1 | $D_{1,2}$ | 0 | 1 | $D_{1,1}$ | 0 | 1 | 0 | 0 |
| 7 | 1 | 0 | 0 | 1 | $D_{1,1}$ | 0 | 1 | $D_{2,2}$ | 1 | 1 | $D_{1,1}$ | 0 | 1 | 0 | 0 |
| 8 | 1 | 0 | 0 | 0 | $D_{1,1}$ | 0 | 1 | $D_{1,2}$ | 0 | 0 | $D_{1,1}$ | 0 | 1 | 0 | 0 |
| 9 | 0 | 1 | 1 | 1 | $D_{2,1}$ | 1 | 1 | $D_{1,2}$ | 0 | 1 | $D_{2,1}$ | 0 | 1 | 0 | 1 |
| 10 | 0 | 1 | 1 | 0 | $D_{2,1}$ | 1 | 1 | $D_{1,2}$ | 0 | 1 | $D_{2,1}$ | 0 | 1 | 0 | 1 |
| 11 | 0 | 1 | 0 | 1 | $D_{2,1}$ | 1 | 1 | $D_{2,2}$ | 1 | 1 | $D_{2,1}$ | 0 | 1 | 0 | 1 |
| 12 | 0 | 1 | 0 | 0 | $D_{2,1}$ | 1 | 1 | $D_{1,2}$ | 0 | 0 | $D_{2,1}$ | 0 | 1 | 0 | 1 |
| 13 | 0 | 0 | 1 | 1 | $D_{1,1}$ | 0 | 0 | $D_{1,2}$ | 0 | 1 | $D_{1,2}$ | 1 | 1 | 1 | 0 |
| 14 | 0 | 0 | 1 | 0 | $D_{1,1}$ | 0 | 0 | $D_{1,2}$ | 0 | 1 | $D_{1,2}$ | 1 | 1 | 1 | 0 |
| 15 | 0 | 0 | 0 | 1 | $D_{1,1}$ | 0 | 0 | $D_{2,2}$ | 1 | 1 | $D_{2,2}$ | 1 | 1 | 1 | 1 |
| 16 | 0 | 0 | 0 | 0 | $D_{1,1}$ | 0 | 0 | $D_{1,2}$ | 0 | 0 | $D_{1,1}$ | 0 | 0 | 0 | 0 |

Figure 4:
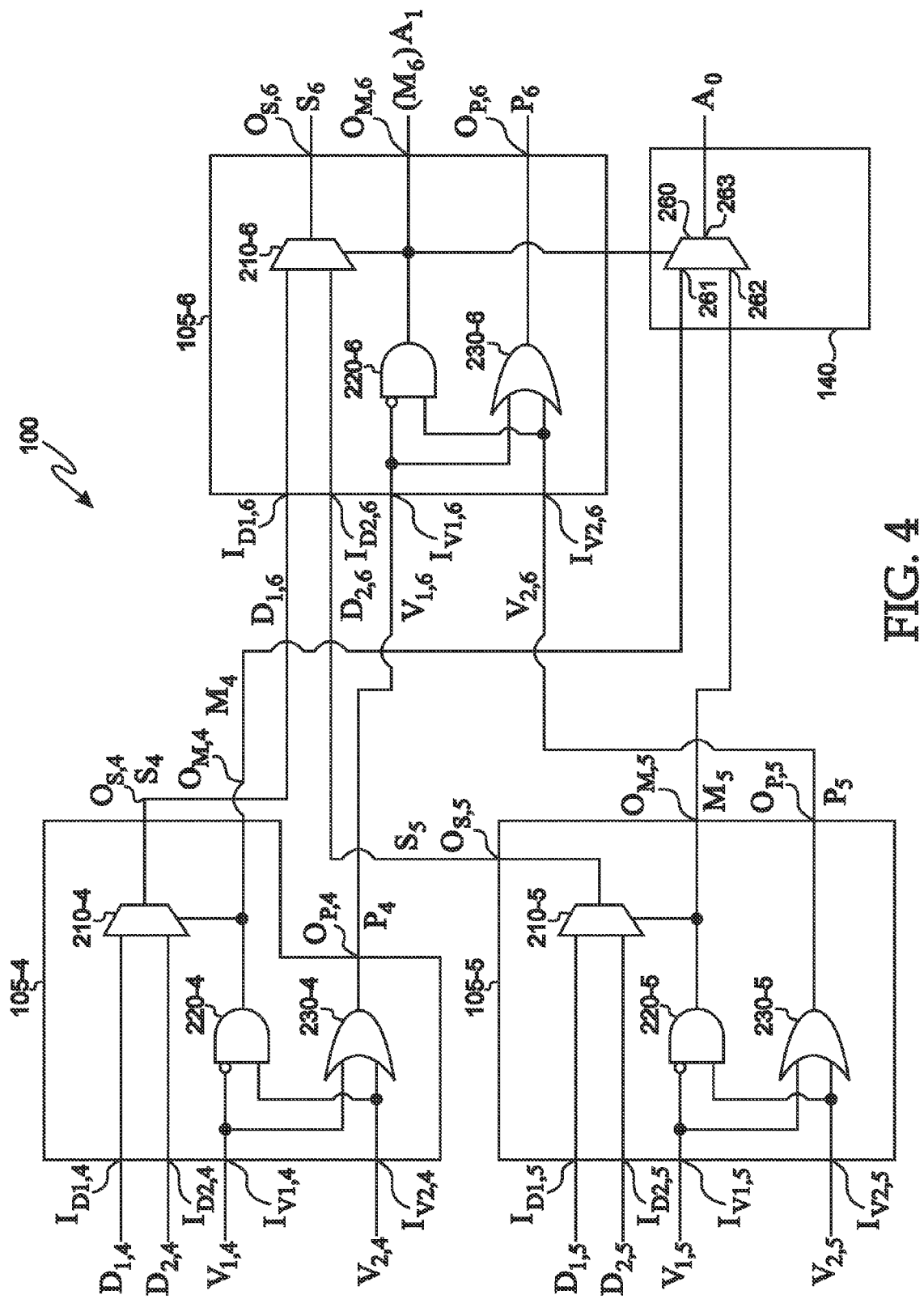
FIG. 4 is a drawing of a circuit diagram of yet another data selection circuit as described in various representative embodiments.

FIG. 4 is a drawing of a circuit diagram of yet another data selection circuit 100 as described in various representative embodiments. In the representative embodiment of FIG. 4, the data selection circuit 100 comprises three selection modules 105 identified in the figure as fourth selection module 105-4, fifth selection module 105-5, and sixth selection module 105-6. The fourth selection module 105-4, the fifth selection module 105-5, and the sixth selection module 105-6 are configured the same as the selection module 105 of FIG. 2. In an alternative embodiment, the fourth selection module 105-4, the fifth selection module 105-5, and the sixth selection module 105-6 are configured the same as the selection module 105 of FIG. 1. In FIG. 4 for either embodiment, the selected data output $O_{S,4}$ of the fourth selection module 105-4 is coupled to the first data input $I_{D1,6}$ of the sixth selection module 105-6; the selected data output $O_{S,5}$ of the fifth selection module 105-5 is coupled to the second data input $I_{D2,6}$ of the sixth selection module 105-6; the presence output $O_{P,4}$ of the fourth selection module 105-4 is coupled to the first validation input $I_{V1,6}$ of the sixth selection module 105-6; and the presence output $O_{P,5}$ of the fifth selection module 105-5 is coupled to the second validation input $I_{V2,6}$ of the sixth selection module 105-6.

As in FIG. 2, each of the selection modules 105-4, 105-5, 105-6 in FIG. 4 comprises a selection multiplexer 210, a modified AND-gate 220, and an OR-gate 230 internally coupled as in FIG. 2 and as also shown in FIG. 3. In FIG. 4, the selection multiplexer 210 for the fourth selection module data signal $D_{2,4}$ received at the second data input $I_{D2,4}$ of the fourth selection module 105-4 is valid. The presence signal $P_4$ outputted at the presence output $O_{P,4}$ of the fourth selection module 105-4 identifies whether or not at least one data signal $D_{1,4},D_{2,4}$ of the fourth selection module 105-4 is valid. In this representative embodiment, the first data input $I_{D1,4}$ of the fourth selection module 105-4 has an assigned selection priority higher than that assigned to the second data input $I_{D2,4}$ of the fourth selection module 105-4. If at least one data signal $D_{1,4},D_{2,4}$ of the fourth selection module 105-4 is identified as valid, the valid data signal $D_{1,4},D_{2,4}$ of the fourth selection module 105-4 having the higher assigned priority is transferred to the selected data output $O_{S,4}$ of the fourth selection module 105-4. And, the marker signal $M_4$ at the marker output $O_{M,4}$ of the fourth selection module 105-4 identifies from which data input $I_{D1,4},I_{D2,4}$ of the fourth selection module 105-4 the transferred data signal $D_{1,4},D_{2,4}$ of the fourth selection module 105-4 was transferred. As in the representative embodiments of FIGS. 1 and 2, the fourth selection module 105-4 is configured such that a valid first data signal $D_{1,4}$ received at the first data input $I_{D1,4}$ of the fourth selection module 105-4 has a higher priority than a valid second data signal $D_{2,4}$ received at the second data input $I_{D2,4}$ of the fourth selection module 105-4.

In a similar manner, the first validation signal $V_{1,5}$ received at the first validation input $I_{V1,5}$ of the fifth selection module 105-5 identifies whether or not the first data signal $D_{1,5}$ received at the first data input $I_{D1,5}$ of the fifth selection module 105-5 is valid. The second validation signal $V_{2,5}$ received at the second validation input $I_{V2,5}$ of the fifth selection module 105-5 identifies whether or not the second data signal $D_{2,5}$ received at the second data input $I_{D2,5}$ of the fifth selection module 105-5 is valid. The presence signal $P_5$ outputted at the presence output $O_{P,5}$ of the fifth selection module 105-5 identifies whether or not at least one data signal $D_{1,5},D_{2,5}$ of the fifth selection module 105-5 is valid. In this representative embodiment, the first data input $I_{D1,5}$ of the fifth selection module 105-5 has an assigned selection priority higher than that assigned to the second data input $I_{D2,5}$ of the fifth selection module 105-5. If at least one data signal $D_{1,5},D_{2,5}$ of the fifth selection module 105-5 is identified as valid, the valid data signal $D_{1,5},D_{2,5}$ of the fifth selection module 105-5 having the higher assigned priority is transferred to the selected data output $O_{S,5}$ of the fifth selection module 105-5. And, the marker signal $M_5$ at the marker output $O_{M,5}$ of the fifth selection module 105-5 identifies from which data input $I_{D1,5},I_{D2,5}$ the transferred data signal $D_{1,5},D_{2,5}$ of the fifth selection module 105-5 was transferred. As in the representative embodiments of FIGS. 1 and 2, the fifth selection module 105-5 is configured such that a valid first data signal $D_{1,5}$ received at the first data input $I_{D1,5}$ of the fifth selection module 105-5 has a higher priority than a valid second data signal $D_{2,5}$ received at the second data input $I_{D2,5}$ of the fifth selection module 105-5.

And, the first validation signal $V_{1,6}$ received at the first validation input $I_{V1,6}$ of the sixth selection module 105-6 identifies whether or not the first data signal $D_{1,6}$ received at the first data input $I_{D1,6}$ of the sixth selection module 105-6 is valid. The second validation signal $V_{2,6}$ received at the second validation input $I_{V2,6}$ of the sixth selection module 105-6 identifies whether or not the second data signal $D_{2,6}$ received at the second data input $I_{D2,6}$ of the sixth selection module 105-6 is valid. The presence signal $P_6$ outputted at the presence output $O_{P,6}$ of the sixth selection module 105-6 identifies whether or not at least one data signal $D_{1,6},D_{2,6}$ of the sixth selection module 105-6 is valid. In this representative embodiment, the first data input $I_{D1,6}$ of the sixth selection module 105-6 has an assigned selection priority higher than that assigned to the second data input $I_{D2,6}$ of the sixth selection module 105-6. If at least one data signal $D_{1,6},D_{2,6}$ of the sixth selection module 105-6 is identified as valid, the valid data signal $D_{1,6},D_{2,6}$ of the sixth selection module 105-6 having the higher assigned priority is transferred to the selected data output $O_{S,6}$ of the sixth selection module 105-6. And, the marker signal $M_6$ at the marker output $O_{M,6}$ of the sixth selection module 105-6 identifies from which data input $I_{D1,6},I_{D2,6}$ the transferred data signal $D_{1,6},D_{2,6}$ of the sixth selection module 105-6 was transferred. As in the representative embodiments of FIGS. 1 and 2, the sixth selection module 105-6 is configured such that a valid first data signal $D_{1,6}$ received at the first data input $I_{D1,6}$ of the sixth selection module 105-6 has a higher priority than a valid second data signal $D_{2,6}$ received at the second data input $I_{D2,6}$ of the sixth selection module 105-6.

It follows from the above discussion, that a valid first data signal $D_{1,4}$ received at the first data input $I_{D1,4}$ of the fourth selection module 105-4 has a higher priority than a valid second data signal $D_{2,4}$ received at the second data input $I_{D2,4}$ of the fourth selection module 105-4, that a valid second data signal $D_{2,4}$ received at the second data input $I_{D2,4}$ of the fourth selection module 105-4 has a higher priority than a valid first data signal $D_{1,5}$ received at the first data input $I_{D1,5}$ of the fifth selection module 105-5, and that a valid first data signal $D_{1,5}$ received at the first data input $I_{D1,5}$ of the fifth selection module 105-5 has a higher priority than a valid second data signal $D_{2,5}$ received at the second data input $I_{D2,5}$ of the fifth selection module 105-5.

The data selection circuit 100 of FIG. 4 further comprises an address module 140. The address module comprises a second address multiplexer 260 having a first second-address-multiplexer input 261, a second second-address-multiplexer input 262, a second-address-multiplexer output 263, and a second-address-multiplexer control input 264. The first second-address-multiplexer input 261 is coupled to the marker signal $M_4$ at the marker output $O_{M,4}$ of the fourth selection module 105-4, the second second-address-multiplexer input 262 is coupled to the marker signal $M_5$ at the marker output $O_{M,5}$ of the fifth selection module 105-5, and the second-address-multiplexer control input 264 is coupled to the marker signal $M_6$ at the marker output $O_{M,6}$ of the sixth selection module 105-6.

The data signal $D_{1,4},D_{2,4},D_{1,5},D_{2,5}$ of whichever of the data inputs $I_{D1,4},I_{D2,4},I_{D1,5},I_{D2,5}$ of the fourth and fifth selection modules 105-4,105-5 that has the higher priority will be transferred to the selected data output $O_{S,6}$ of the sixth selection module 105-6 as the selected signal $S_6$. The presence signal $P_6$ at the presence output $O_{P,6}$ of the sixth selection module 105-6 indicates whether or not at least one of the data signals $D_{1,4},D_{2,4},D_{1,5},D_{2,5}$ of the fourth and fifth selection modules 105-4,105-5 transferred to the selected data output $O_{S,6}$ of the sixth selection module 105-6 as the selected signal $S_6$ is valid. The marker signal $M_6$ at the marker output $O_{M,6}$ of the sixth selection module 105-6 identifies from which data input $I_{D1,6},I_{D2,6}$ of the sixth selection module 105-6 the transferred data signal $D_{1,4},D_{2,4},D_{1,5},D_{2,5}$ of the fourth and fifth selection modules 105-4,105-5 was transferred. Thus, the marker signal $M_6$ at the marker output $O_{M,6}$ of the sixth selection module 105-6 is the first (higher) order bit-address $A_1$ (see Table 3) of the selected data input $I_{D1,4},I_{D2,4},I_{D1,5},I_{D2,5}$. The value of the second-address-multiplexer output 263 is the zero (lowest) order bit-address $A_0$ (see Table 3) of the selected data input $I_{D1,4},I_{D2,4},I_{D1,5},I_{D2,5}$ of the fourth and fifth selection modules 105-4,105-5.

TABLE 3

| Row | $V_{1,4}$ | $V_{2,4}$ | $V_{1,5}$ | $V_{2,5}$ | $S_4$ | $M_4$ | $P_4$ | $S_5$ | $M_5$ | $P_5$ | $S_6$ | $M_6$ | $P_6$ | $A_1$ | $A_0$ |
|---|---|---|---|---|---|---|---|---|---|---|---|---|---|---|---|
| 1 | 1 | 1 | 1 | 1 | $D_{1,4}$ | 0 | 1 | $D_{1,5}$ | 0 | 1 | $D_{1,4}$ | 0 | 1 | 0 | 0 |
| 2 | 1 | 1 | 1 | 0 | $D_{1,4}$ | 0 | 1 | $D_{1,5}$ | 0 | 1 | $D_{1,4}$ | 0 | 1 | 0 | 0 |
| 3 | 1 | 1 | 0 | 1 | $D_{1,4}$ | 0 | 1 | $D_{2,5}$ | 1 | 1 | $D_{1,4}$ | 0 | 1 | 0 | 0 |
| 4 | 1 | 1 | 0 | 0 | $D_{1,4}$ | 0 | 1 | $D_{1,5}$ | 0 | 0 | $D_{1,4}$ | 0 | 1 | 0 | 0 |
| 5 | 1 | 0 | 1 | 1 | $D_{1,4}$ | 0 | 1 | $D_{1,5}$ | 0 | 1 | $D_{1,4}$ | 0 | 1 | 0 | 0 |
| 6 | 1 | 0 | 1 | 0 | $D_{1,4}$ | 0 | 1 | $D_{1,5}$ | 0 | 1 | $D_{1,4}$ | 0 | 1 | 0 | 0 |
| 7 | 1 | 0 | 0 | 1 | $D_{1,4}$ | 0 | 1 | $D_{2,5}$ | 1 | 1 | $D_{1,4}$ | 0 | 1 | 0 | 0 |
| 8 | 1 | 0 | 0 | 0 | $D_{1,4}$ | 0 | 1 | $D_{1,5}$ | 0 | 0 | $D_{1,4}$ | 0 | 1 | 0 | 0 |
| 9 | 0 | 1 | 1 | 1 | $D_{2,4}$ | 1 | 1 | $D_{1,5}$ | 0 | 1 | $D_{2,4}$ | 0 | 1 | 0 | 1 |

TABLE 3-continued

| Row | $V_{1,4}$ | $V_{2,4}$ | $V_{1,5}$ | $V_{2,5}$ | $S_4$ | $M_4$ | $P_4$ | $S_5$ | $M_5$ | $P_5$ | $S_6$ | $M_6$ | $P_6$ | $A_1$ | $A_0$ |
|---|---|---|---|---|---|---|---|---|---|---|---|---|---|---|---|
| 10 | 0 | 1 | 1 | 0 | $D_{2,4}$ | 1 | 1 | $D_{1,5}$ | 0 | 1 | $D_{2,4}$ | 0 | 1 | 0 | 1 |
| 11 | 0 | 1 | 0 | 1 | $D_{2,4}$ | 1 | 1 | $D_{2,5}$ | 1 | 1 | $D_{2,4}$ | 0 | 1 | 0 | 1 |
| 12 | 0 | 1 | 0 | 0 | $D_{2,4}$ | 1 | 1 | $D_{1,5}$ | 0 | 0 | $D_{2,4}$ | 0 | 1 | 0 | 1 |
| 13 | 0 | 0 | 1 | 1 | $D_{1,4}$ | 0 | 0 | $D_{1,5}$ | 0 | 1 | $D_{1,5}$ | 1 | 1 | 1 | 0 |
| 14 | 0 | 0 | 1 | 0 | $D_{1,4}$ | 0 | 0 | $D_{1,5}$ | 0 | 1 | $D_{1,5}$ | 1 | 1 | 1 | 0 |
| 15 | 0 | 0 | 0 | 1 | $D_{1,4}$ | 0 | 0 | $D_{2,5}$ | 1 | 1 | $D_{2,5}$ | 1 | 1 | 1 | 1 |
| 16 | 0 | 0 | 0 | 0 | $D_{1,4}$ | 0 | 0 | $D_{1,5}$ | 0 | 0 | $D_{1,4}$ | 0 | 0 | 0 | 0 |

Table 3 is a truth table for the data selection circuit 100 of FIG. 4. As shown in rows 1-8 of Table 3, if the first data signal $D_{1,4}$ of the fourth selection module 105-4 is valid, the data selection circuit 100 of FIG. 4 will select the first data signal $D_{1,4}$ of the fourth selection module 105-4 to output as the selected signal $S_6$ at the selected data Output $O_{S,6}$ of the sixth selection module 105-6 regardless of whether or not the remaining data signals $D_{2,4}, D_{1,5}, D_{2,5}$ are valid. Also, as shown in rows 9-12 of Table 3, if the first data signal $D_{1,4}$ of the fourth selection module 105-4 is invalid and the second data signal $D_{2,4}$ of the fourth selection module 105-4 is valid, the data selection circuit 100 of FIG. 4 will select the second data signal $D_{2,4}$ of the fourth selection module 105-4 to output as the selected signal $S_6$ at the selected data output $O_{S,6}$ of the sixth selection module 105-6 regardless of whether or not the remaining data signals $D_{1,5}, D_{2,5}$ are valid.

And, as shown in rows 13-14 of Table 3, if the first data signal $D_{1,4}$ of the fourth selection module 105-4 is invalid, the second data signal $D_{2,4}$ of the fourth selection module 105-4 is invalid, and the first data signal $D_{1,5}$ of the fifth selection module 105-5 is valid, the data selection circuit 100 of FIG. 4 will select the first data signal $D_{1,5}$ of the fifth selection module 105-5 to output as the selected signal $S_6$ at the selected data output $O_{S,6}$ of the sixth selection module 105-6 regardless of whether or not the remaining data signal $D_{2,5}$ is valid. Further, as shown in row 15 of Table 3, if the first data signal $D_{1,4}$ of the fourth selection module 105-4 is invalid, the second data signal $D_{2,4}$ of the fourth selection module 105-4 is invalid, the first data signal $D_{1,5}$ of the fifth selection module 105-5 is invalid, and the second data signal $D_{2,5}$ of the fifth selection module 105-5 is valid, the data selection circuit 100 of FIG. 4 will select the second data signal $D_{2,5}$ of the fifth selection module 105-5 to output as the selected signal $S_6$ at the selected data output $O_{S,6}$ of the sixth selection module 105-6. And further, as shown in row 16 of Table 3, if the first data signal $D_{1,4}$ of the fourth selection module 105-4 is invalid, the second data signal $D_{2,4}$ of the fourth selection module 105-4 is invalid, the first data signal $D_{1,5}$ of the fifth selection module 105-5 is invalid, and the second data signal $D_{2,5}$ of the fifth selection module 105-5 is invalid, the data selection circuit 100 of FIG. 4 will select the first data signal $D_{1,4}$ of the fourth selection module 105-4 to output as the selected signal $S_6$ at the selected data output $O_{S,6}$ of the sixth selection module 105-6. However, in this last case, the presence signal $P_6$ at the presence output $O_{P,6}$ of the sixth selection module 105-6 is a logic "0" indicating that the selected signal $S_6$ at the selected data output $O_{S,6}$ of the sixth selection module 105-6 is invalid.

Figure 5:
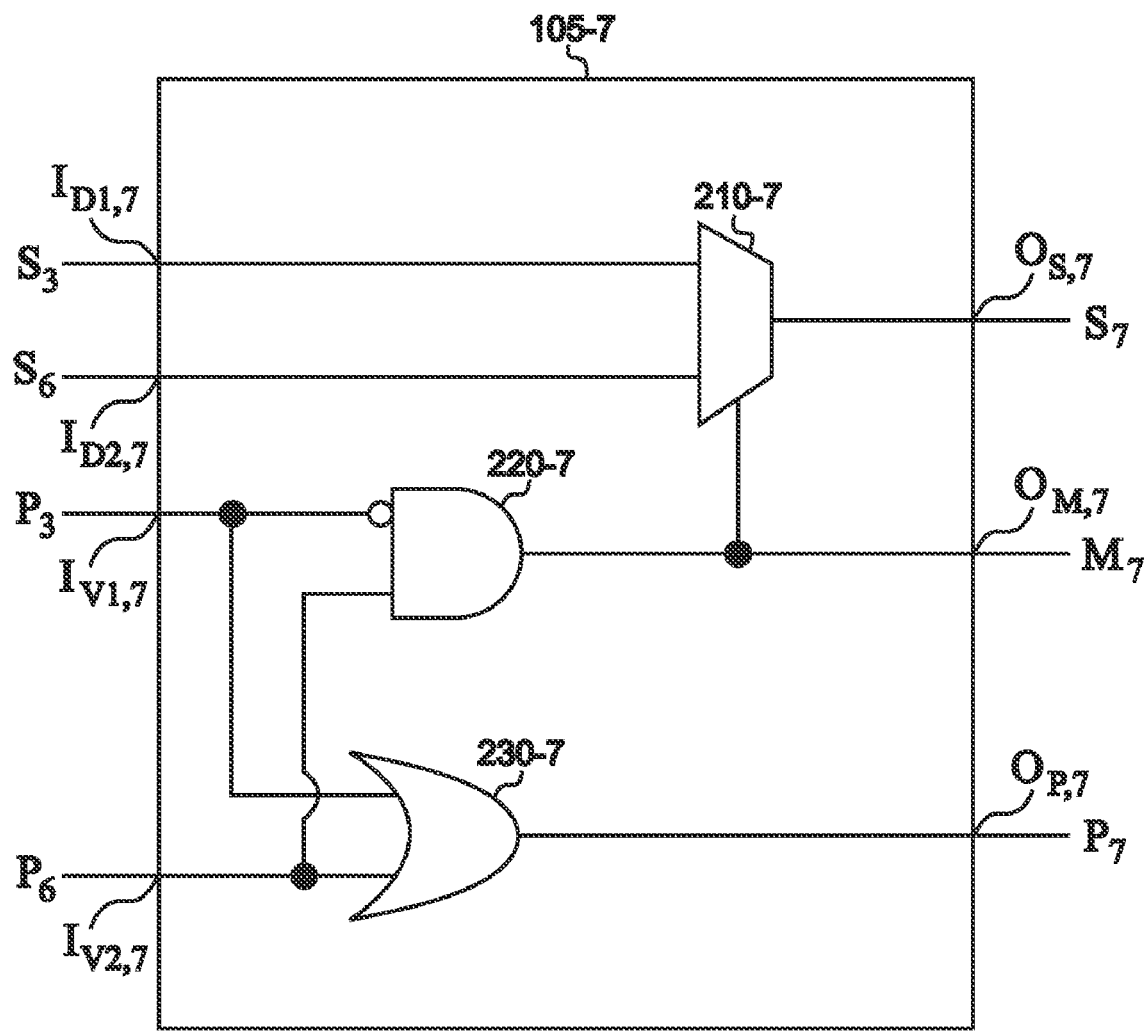
FIG. 5 is a drawing of a circuit diagram of still yet another selection circuit as described in various representative embodiments.

FIG. 5 is a drawing of a circuit diagram of still yet another selection circuit 100 as described in various representative embodiments. In the representative embodiment of FIG. 5, the data selection circuit 100 comprises one selection module 105 identified in the figure as seventh selection module 105-7. The seventh selection module 105-7 is configured the same as the selection module 105 of FIG. 2. In an alternative embodiment, the seventh selection module 105-7 is configured the same as the selection module 105 of FIG. 1.

As in FIG. 2, the seventh selection module 105-7 in FIG. 5 comprises a selection multiplexer 210, a modified AND-gate 220, and an OR-gate 230 internally coupled as in FIG. 2. In FIG. 5, the selection multiplexer 210 for the seventh selection module 105-7 is indicated as selection multiplexer 210-7; the modified AND-gate 220 for the seventh selection module 105-7 is indicated as modified AND-gate 220-7; and the OR-gate 230 for the seventh selection module 105-7 is indicated as selection multiplexer 230-7.

In operation, as in FIGS. 1 and 2, the first validation signal $V_{1,7}$ received at the first validation input $I_{V1,7}$ of the seventh selection module 105-7 identifies whether or not the first data signal $D_{1,7}$ received at the first data input $I_{D1,7}$ of the seventh selection module 105-7 is valid. The second validation signal $V_{2,7}$ received at the second validation input $I_{V2,7}$ of the seventh selection module 105-7 identifies whether or not the second data signal $D_{2,7}$ received at the second data input $I_{D2,7}$ of the seventh selection module 105-7 is valid. The presence signal $P_7$ outputted at the presence output $O_{P,7}$ of the seventh selection module 105-7 identifies whether or not at least one data signal $D_{1,7}, D_{2,7}$ of the seventh selection module 105-7 is valid. In this representative embodiment, the first data input $I_{D1,7}$ of the seventh selection module 105-7 has an assigned selection priority higher than that assigned to the second data input $I_{D2,7}$ of the seventh selection module 105-7. If at least one data signal $D_{1,7}, D_{2,7}$ of the seventh selection module 105-7 is identified as valid, the valid data signal $D_{1,7}, D_{2,7}$ of the seventh selection module 105-7 having the higher assigned priority is transferred to the selected data output $O_{S,7}$ of the seventh selection module 105-7. And, the marker signal $M_7$ at the marker output $O_{M,7}$ of the seventh selection module 105-7 identifies from which data input $I_{D1,7}, I_{D2,7}$ of the seventh selection module 105-7 the transferred data signal $D_{1,7}, D_{2,7}$ of the seventh selection module 105-7 was transferred. As in the representative embodiments of FIG. 5, the seventh selection module 105-7 is configured such that a valid first data signal $D_{1,7}$ received at the first data input $I_{D1,7}$ of the seventh selection module 105-7 has a higher priority than a valid second data signal $D_{2,7}$ received at the second data input $I_{D2,7}$ of the seventh selection module 105-7.

Figure 6:
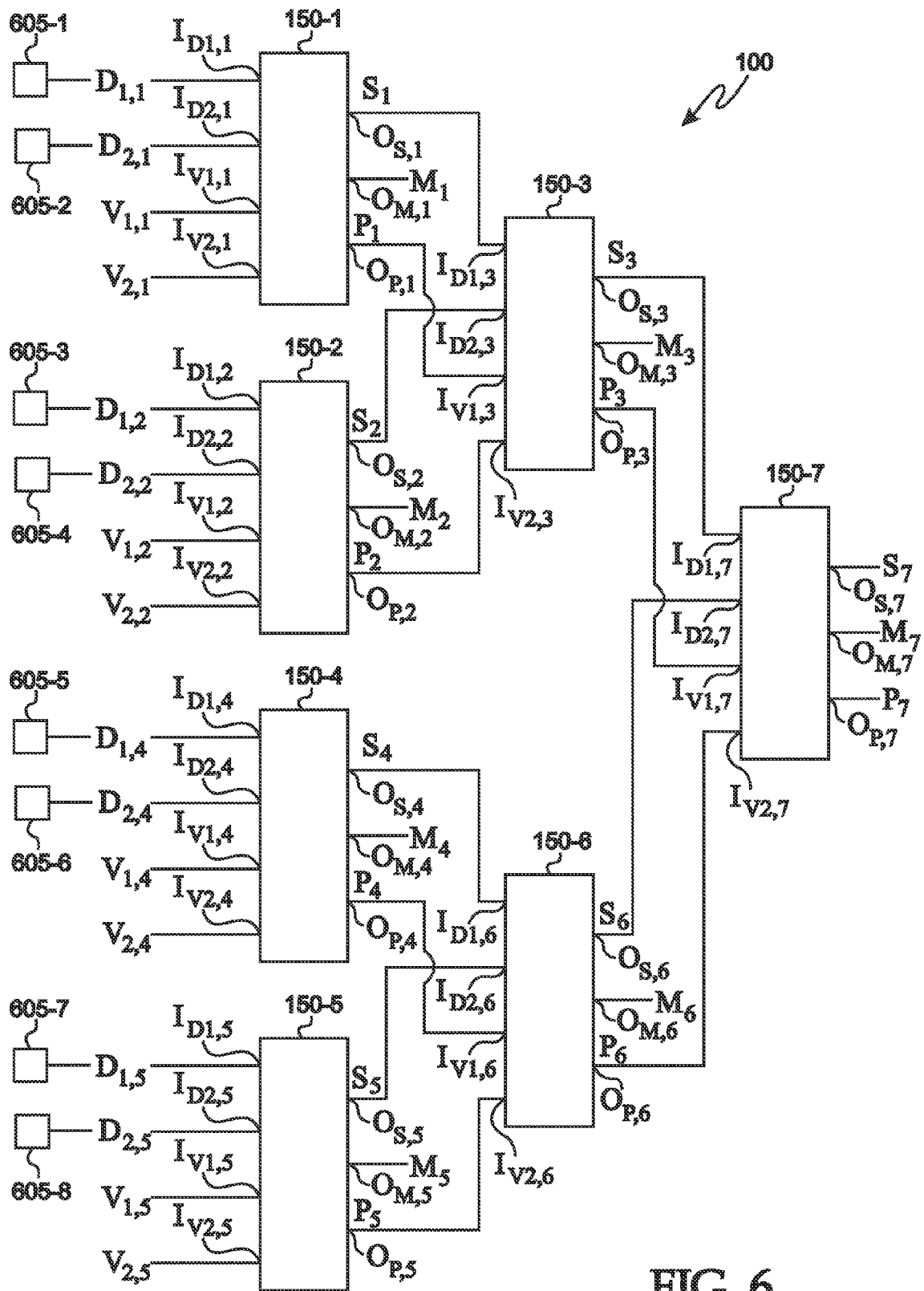
FIG. 6 is a drawing of a circuit diagram of even another selection circuit as described in various representative embodiments.

FIG. 6 is a drawing of a circuit diagram of even another selection circuit 100 as described in various representative embodiments. In the representative embodiment of FIG. 6, the data selection circuit 100 comprises the first selection module 105-1, the second selection module 105-2, the third selection module 105-3, the fourth selection module 105-4, the fifth selection module 105-5, the sixth selection module 105-6, and the seventh selection module 105-7. The first, second, third, fourth, fifth, sixth, and seventh selection modules 105-1,105-2, 105-3,105-4, 105-5,105-6, 105-7 can be configured the same as the selection module 105 of FIG. 1 or alternatively of FIG. 2.

The first selection module 105-1 has as input couplings a first data input $I_{D1,1}$ where it is configured to receive a first data signal $D_{1,1}$ a second data input $I_{D2,1}$ where it is configured to receive a second data signal $D_{2,1}$, a first validation input $I_{V1,1}$ where it is configured to receive a first validation signal $V_{1,1}$ and a second validation input $I_{V2,1}$ where it is configured to receive a second validation signal $V_{2,1}$, and it has as output couplings a selected data output $O_{S,1}$ where a selected signal $S_1$ is outputted, a marker output $O_{M,1}$ where a marker signal $M_1$ is outputted, and a presence output $O_{P,1}$ where a presence signal $P_1$ is outputted.

The second selection module 105-2 has as input couplings a first data input $I_{D1,2}$ where it is configured to receive a first data signal $D_{1,2}$, a second data input $I_{D2,2}$ where it is configured to receive a second data signal $D_{2,2}$, a first validation input $I_{V1,2}$ where it is configured to receive a first validation signal $V_{1,2}$, and a second validation input $I_{V2,2}$ where it is configured to receive a second validation signal $V_{2,2}$, and it has as output couplings a selected data output $O_{S,2}$ where a selected signal $S_2$ is outputted, a marker output $O_{M,2}$ where a marker signal $M_2$ is outputted, and a presence output $O_{P,2}$ where a presence signal $P_2$ is outputted.

The third selection module 105-3 has as input couplings a first data input $I_{D1,3}$ where it is configured to receive a first data signal $D_{1,3}$, a second data input $I_{D2,3}$ where it is configured to receive a second data signal $D_{2,3}$, a first validation input $I_{V1,3}$ where it is configured to receive a first validation signal $V_{1,3}$, and a second validation input $I_{V2,3}$ where it is configured to receive a second validation signal $V_{2,3}$, and it has as output couplings a selected data output $O_{S,3}$ where a selected signal $S_3$ is outputted, a marker output $O_{M,3}$ where a marker signal $M_3$ is outputted, and a presence output $O_{P,3}$ where a presence signal $P_3$ is outputted.

The fourth selection module 105-4 has as input couplings a first data input $I_{D1,4}$ where it is configured to receive a first data signal $D_{1,4}$, a second data input $I_{D2,4}$ where it is configured to receive a second data signal $D_{2,4}$, a first validation input $I_{V1,4}$ where it is configured to receive a first validation signal $V_{1,4}$, and a second validation input $I_{V2,4}$ where it is configured to receive a second validation signal $V_{2,4}$, and it has as output couplings a selected data output $O_{S,4}$ where a selected signal $S_4$ is outputted, a marker output $O_{M,4}$ where a marker signal $M_4$ is outputted, and a presence output $O_{P,4}$ where a presence signal $P_4$ is outputted.

The fifth selection module 105-5 has as input couplings a first data input $I_{D1,5}$ where it is configured to receive a first data signal $D_{1,5}$, a second data input $I_{D2,5}$ where it is configured to receive a second data signal $D_{2,5}$, a first validation input $I_{V1,5}$ where it is configured to receive a first validation signal $V_{1,5}$, and a second validation input $I_{V2,5}$ where it is configured to receive a second validation signal $V_{2,5}$, and it has as output couplings a selected data output $O_{S,5}$ where a selected signal $S_5$ is outputted, a marker output $O_{M,5}$ where a marker signal $M_5$ is outputted, and a presence output $O_{P,5}$ where a presence signal $P_5$ is outputted.

The sixth selection module 105-6 has as input couplings a first data input $I_{D1,6}$ where it is configured to receive a first data signal $D_{1,6}$, a second data input $I_{D2,6}$ where it is configured to receive a second data signal $D_{2,6}$, a first validation input $I_{V1,6}$ where it is configured to receive a first validation signal $V_{1,6}$, and a second validation input $I_{V2,6}$ where it is configured to receive a second validation signal $V_{2,6}$, and it has as output couplings a selected data output $O_{S,6}$ where a selected signal $S_6$ is outputted, a marker output $O_{M,6}$ where a marker signal $M_6$ is outputted, and a presence output $O_{P,6}$ where a presence signal $P_6$ is outputted.

The seventh selection module 105-7 has as input couplings a first data input $I_{D1,7}$ where it is configured to receive a first data signal $D_{1,7}$, a second data input $I_{D2,7}$ where it is configured to receive a second data signal $D_{2,7}$, a first validation input $I_{V1,7}$ where it is configured to receive a first validation signal $V_{1,7}$, and a second validation input $I_{V2,7}$ where it is configured to receive a second validation signal $V_{2,7}$, and it has as output couplings a selected data output $O_{S,7}$ where a selected signal $S_7$ is outputted, a marker output $O_{M,7}$ where a marker signal $M_7$ is outputted, and a presence output $O_{P,7}$ where a presence signal $P_7$ is outputted.

As in FIG. 3, the selected data output $O_{S,1}$ of the first selection module 105-1 is coupled to the first data input $I_{D1,3}$ of the third selection module 105-3; the selected data output $O_{S,2}$ of the second selection module 105-2 is coupled to the second data input $I_{D2,3}$ of the third selection module 105-3; the presence output $O_{P,1}$ of the first selection module 105-1 is coupled to the first validation input $I_{V1,3}$ of the third selection module 105-3; and the presence output $O_{P,2}$ of the second selection module 105-2 is coupled to the second validation input $I_{V2,3}$ of the third selection module 105-3.

As in FIG. 4, the selected data output $O_{S,4}$ of the fourth selection module 105-4 is coupled to the first data input $I_{D1,6}$ of the sixth selection module 105-6; the selected data output $O_{S,5}$ of the fifth selection module 105-5 is coupled to the second data input $I_{D2,6}$ of the sixth selection module 105-6; the presence output $O_{P,4}$ of the fourth selection module 105-4 is coupled to the first validation input $I_{V1,6}$ of the sixth selection module 105-6; and the presence output $O_{P,5}$ of the fifth selection module 105-5 is coupled to the second validation input $I_{V2,6}$ of the sixth selection module 105-6.

Also, the selected data output $O_{S,3}$ of the third selection module 105-3 is coupled to the first data input $I_{D1,7}$ of the seventh selection module 105-7; the selected data output $O_{S,6}$ of the sixth selection module 105-6 is coupled to the second data input $I_{D2,7}$ of the seventh selection module 105-7; the presence output $O_{P,3}$ of the third selection module 105-3 is coupled to the first validation input $I_{V1,7}$ of the seventh selection module 105-7; and the presence output $O_{P,6}$ of the sixth selection module 105-6 is coupled to the second validation input $I_{V2,7}$ of the seventh selection module 105-7.

Depending upon the first and second validation signals $V_{1,1},V_{2,1}$ at respectively the first and second validation inputs $I_{V1,1},I_{V2,1}$ of the first selection module 105-1, the first and second validation signals $V_{1,2},V_{2,2}$ at respectively the first and second validation inputs $I_{V1,2},I_{V2,2}$ of the second selection module 105-2, the first and second validation signals $V_{1,4},V_{2,4}$ at respectively the first and second validation inputs $I_{V1,4},I_{V2,4}$ of the fourth selection module 105-4, and the first and second validation signals $V_{1,5},V_{2,5}$ at respectively the first and second validation inputs $I_{V1,5},I_{V2,5}$ of the fifth selection module 105-5, the first or second data signals $D_{1,1},D_{2,1}$ at respectively the first and second data inputs $I_{D1,1},I_{D2,1}$ of the first selection module 105-1, the first or second data signals $D_{1,2},D_{2,2}$ at respectively the first and second data inputs $I_{D1,2},I_{D2,2}$ of the second selection module 105-2, the first or second data signals $D_{1,4},D_{2,4}$ at respectively the first and second data inputs $I_{D1,4},I_{D2,4}$ of the fourth selection module 105-4, and the first or second data signals $D_{1,5},D_{2,5}$ at respectively the first and second data inputs $I_{D1,5},I_{D2,5}$ of the fifth selection module 105-5, having the highest priority will be transferred as the selected signal $S_7$ to the selected data output $O_{S,7}$ of the seventh selection module 105-7. The various data signals $D_{1,1},D_{2,1},D_{1,2},D_{2,2},D_{1,4},D_{2,4},D_{1,5},D_{2,5}$ are obtainable from various data sources 605-1,605-2,605-3,605-4,605-5,

605-6,605-7,605-8. Values for the selected signal $S_3$, the marker signal $M_3$, and the presence signal $P_3$ at the outputs of the third selection module 105-3 are found in Table 2 for various inputs for the first selection module 105-1 and the second selection module 105-2. Values for the selected signal $S_6$, the marker signal $M_6$, and the presence signal $P_6$ at the outputs of the sixth selection module 105-6 are found in Table 3 for various inputs for the fourth selection module 105-4 and the fifth selection module 105-5. For any given input condition, the output values for the third and sixth selection modules 105-3,105-6 can be used to obtain the selected signal $S_7$, the marker signal $M_7$, and the presence signal $P_7$ at the outputs of the seventh selection module 105-7 via a truth table similar to that of Table 1.

In this representative embodiment, the first data input $I_{D1,1}$ of the first selection module 105-1 has an assigned selection priority higher than that assigned to the second data input $I_{D2,1}$ of the first selection module 105-1; the second data input $I_{D2,1}$ of the first selection module 105-1 has an assigned selection priority higher than that assigned to the first data input $I_{D1,2}$ of the second selection module 105-2; the first data input $I_{D1,2}$ of the second selection module 105-2 has an assigned selection priority higher than that assigned to the second data input $I_{D2,2}$ of the second selection module 105-2; the second data input $I_{D2,2}$ of the second selection module 105-2 has an assigned selection priority higher than that assigned to the first data input $I_{D1,4}$ of the fourth selection module 105-4; the first data input $I_{D1,4}$ of the fourth selection module 105-4 has an assigned selection priority higher than that assigned to the second data input $I_{D2,4}$ of the fourth selection module 105-4; the second data input $I_{D2,4}$ of the fourth selection module 105-4 has an assigned selection priority higher than that assigned to the first data input $I_{D1,5}$ of the fifth selection module 105-5; and the first data input $I_{D1,5}$ of the fifth selection module 105-5 has an assigned selection priority higher than that assigned to the second data input $I_{D2,5}$ of the fifth selection module 105-5.

The data input having valid data and having the highest priority will be transferred as the selected signal $S_7$ to the selected data output $O_{S,7}$ of the seventh selection module 105-7. The presence signal $P_7$ at the outputs of the seventh selection module 105-7 indicates whether or not at least one of the data signals is valid. The marker signals $M_1,M_2,M_3,M_4,M_5,M_6,M_7$ identify from which data input of the first, second, fourth, and fifth selection modules 105-1,105-2,105-4,105-5 the transferred data signal was transferred. This identification will be discussed in more detail with the discussion of FIG. 7.

Figure 7:
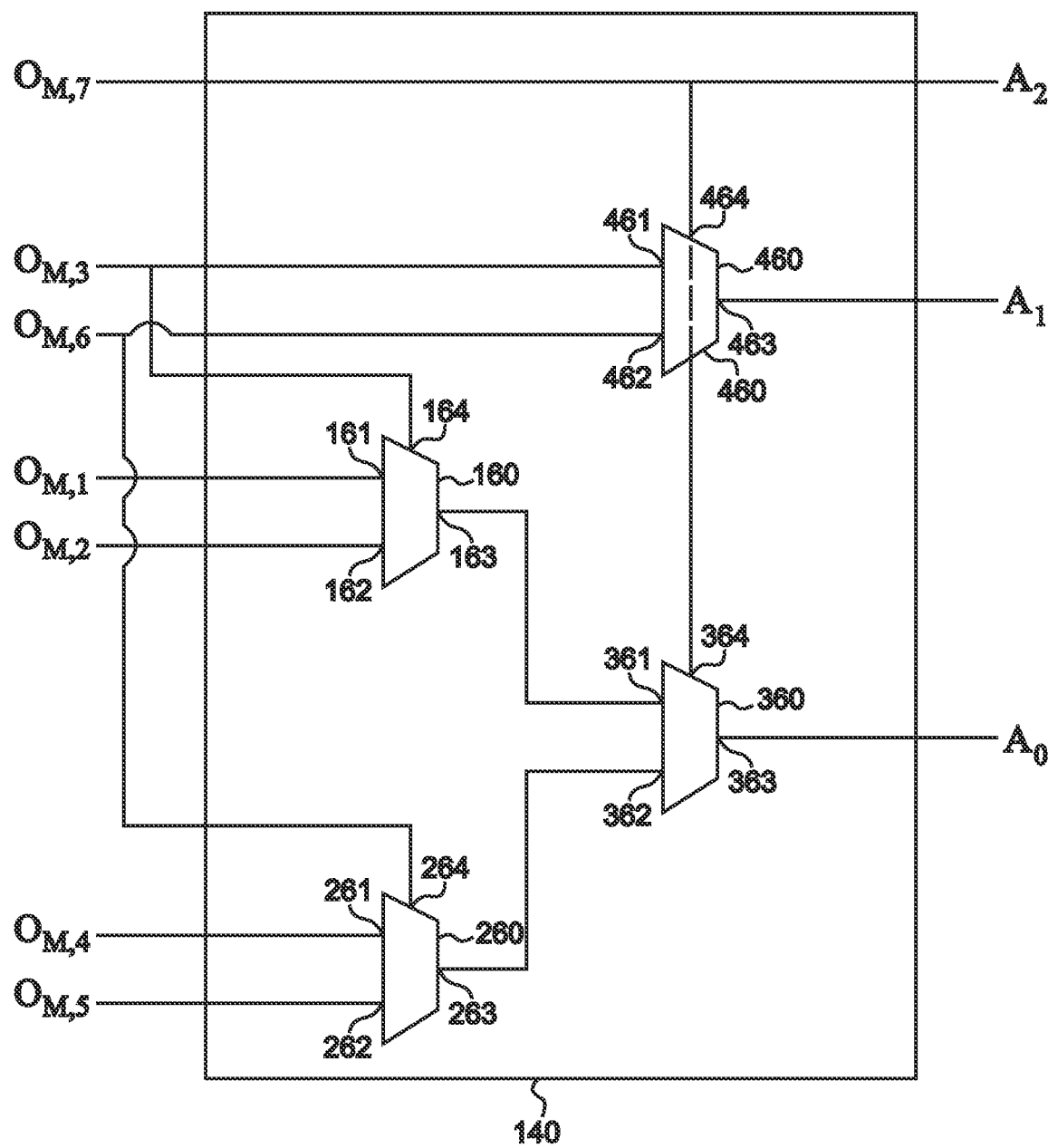
FIG. 7 is a drawing of a circuit diagram of an address module as described in various representative embodiments.

FIG. 7 is a drawing of a circuit diagram of an address module 140 as described in various representative embodiments. In FIG. 7, the address module 140 comprises the first address multiplexer 160, a second address multiplexer 260, a third address multiplexer 360, and a fourth address multiplexer 460. The first address multiplexer 160 has a first first-address-multiplexer input 161, a second first-address-multiplexer input 162, a first-address-multiplexer output 163, and a first-address-multiplexer control input 164. The second address multiplexer 260 has a first second-address-multiplexer input 261, a second second-address-multiplexer input 262, a second-address-multiplexer output 263, and a second-address-multiplexer control input 264. The third address multiplexer 360 has a first third-address-multiplexer input 361, a second third-address-multiplexer input 362, a third-address-multiplexer output 363, and a third-address-multiplexer control input 364. The fourth address multiplexer 460 has a first fourth-address-multiplexer input 461, a second fourth-address-multiplexer input 462, a fourth-address-multiplexer output 463, and a fourth-address-multiplexer control input 464.

The first first-address-multiplexer input 161 is coupled to the marker output $O_{M,1}$ of the first selection module 105-1; the second first-address-multiplexer input 162 is coupled to the marker output $O_{M,2}$ of the second selection module 105-2; the first-address-multiplexer output 163 is coupled to the first third-address-multiplexer input 361; and the first-address-multiplexer control input 164 is coupled to the marker output $O_{M,3}$ of the third selection module 105-3. The first second-address-multiplexer input 261 is coupled to the marker output $O_{M,4}$ of the fourth selection module 105-4; the second second-address-multiplexer input 262 is coupled to the marker output $O_{M,5}$ of the fifth selection module 105-5; the second-address-multiplexer output 263 is coupled to the second third-address-multiplexer input 362; and the second-address-multiplexer control input 264 is coupled to the marker output $O_{M,6}$ of the sixth selection module 105-6. The first fourth-address-multiplexer input 461 is coupled to the marker output $O_{M,3}$ of the third selection module 105-3; the second fourth-address-multiplexer input 462 is coupled to the marker output $O_{M,6}$ of the sixth selection module 105-6; the fourth-address-multiplexer output 463 is coupled to the second (highest) order bit-address $A_2$; and the fourth-address-multiplexer control input 464 is coupled to the marker output $O_{M,7}$ of the seventh selection module 105-7 and to the third-address-multiplexer control input 364. The third-address-multiplexer output 363 is coupled to the first (higher) order bit-address $A_1$.

A complete truth table for FIG. 6 will be very large and for simplification purposes will not be constructed herein. As is known to one of ordinary skill in the art, such a truth table can be constructed by means similar to those used to construct Table 2 for FIG. 3 and Table 3 for FIG. 4. However, as simplified examples, the addresses of valid data are obtained in the following discussion for those cases having only a single data input with a valid data signal.

Table 4 includes selected values from Table 2 which are used to determine the address of the data input for cases wherein there is only one valid data input to the first and second selection modules 105-1,105-2.

Table 5 includes selected values from Table 3 which are used to determine the address of the data input for cases wherein there is only one valid data input to the fourth and fifth selection modules 105-4,105-5.

TABLE 4

| Row | Valid Data | $M_1$ | $M_2$ | $P_1$ | $P_2$ | $(M_3)$ $A_1$ | $A_0$ |
|---|---|---|---|---|---|---|---|
| 1 | $D_{1,1}$ | 0 | 0 | 1 | 0 | 0 | 0 |
| 2 | $D_{2,1}$ | 1 | 0 | 1 | 0 | 0 | 1 |
| 3 | $D_{1,2}$ | 0 | 0 | 0 | 1 | 1 | 0 |
| 4 | $D_{2,2}$ | 0 | 1 | 0 | 1 | 1 | 1 |

TABLE 5

| Row | Valid Data | $M_4$ | $M_5$ | $P_4$ | $P_5$ | $(M_6)$ $A_1$ | $A_0$ |
|---|---|---|---|---|---|---|---|
| 1 | $D_{1,4}$ | 0 | 0 | 1 | 0 | 0 | 0 |
| 2 | $D_{2,4}$ | 1 | 0 | 1 | 0 | 0 | 1 |
| 3 | $D_{1,5}$ | 0 | 0 | 0 | 1 | 1 | 0 |
| 4 | $D_{2,5}$ | 0 | 1 | 0 | 1 | 1 | 1 |

Table 6 includes selected values from a truth table for FIG. 6 had it been constructed. Tables 4 and 5 are used to construct this partial truth table for Table 6. As examples, results of this table indicate in row 1 that the address for a valid first data signal $D_{1,1}$ at the first data input $I_{D1,1}$ of the first selection module 105-1 is (0,0,0) and in row 6 for a valid second data signal $D_{2,4}$ at the second data input $I_{D2,4}$ of the fourth selection module 105-4 is (1,0,1).

TABLE 6

| Row | Valid Data | $M_1$ | $M_2$ | $P_1$ | $P_2$ | $M_3$ | $M_4$ | $M_5$ | $P_4$ | $P_5$ | $M_6$ | $(M_7)A_2$ | $A_1$ | $A_0$ |
|---|---|---|---|---|---|---|---|---|---|---|---|---|---|---|
| 1 | $D_{1,1}$ | 0 | 0 | 1 | 0 | 0 | 0 | 0 | 0 | 0 | 0 | 0 | 0 | 0 |
| 2 | $D_{2,1}$ | 1 | 0 | 1 | 0 | 0 | 0 | 0 | 0 | 0 | 0 | 0 | 0 | 1 |
| 3 | $D_{1,2}$ | 0 | 0 | 0 | 1 | 1 | 0 | 0 | 0 | 0 | 0 | 0 | 1 | 0 |
| 4 | $D_{2,2}$ | 0 | 1 | 0 | 1 | 1 | 0 | 0 | 0 | 0 | 0 | 0 | 1 | 1 |
| 5 | $D_{1,4}$ | 0 | 0 | 0 | 0 | 0 | 0 | 0 | 1 | 0 | 0 | 1 | 0 | 0 |
| 6 | $D_{2,4}$ | 0 | 0 | 0 | 0 | 0 | 1 | 0 | 1 | 0 | 0 | 1 | 0 | 1 |
| 7 | $D_{1,5}$ | 0 | 0 | 0 | 0 | 0 | 0 | 0 | 0 | 1 | 1 | 1 | 1 | 0 |
| 8 | $D_{2,5}$ | 0 | 0 | 0 | 0 | 0 | 0 | 1 | 0 | 1 | 1 | 1 | 1 | 1 |

In similar fashion, representative embodiments disclosed herein can be extended to include larger numbers of inputs which could be, for example, 16, 32, 64, etc. Should the number of inputs not be a power of 2, appropriate validation inputs to appropriate selection modules could be hard wired to logic "0s" thereby avoiding the use of unnecessary components.

Figure 8:
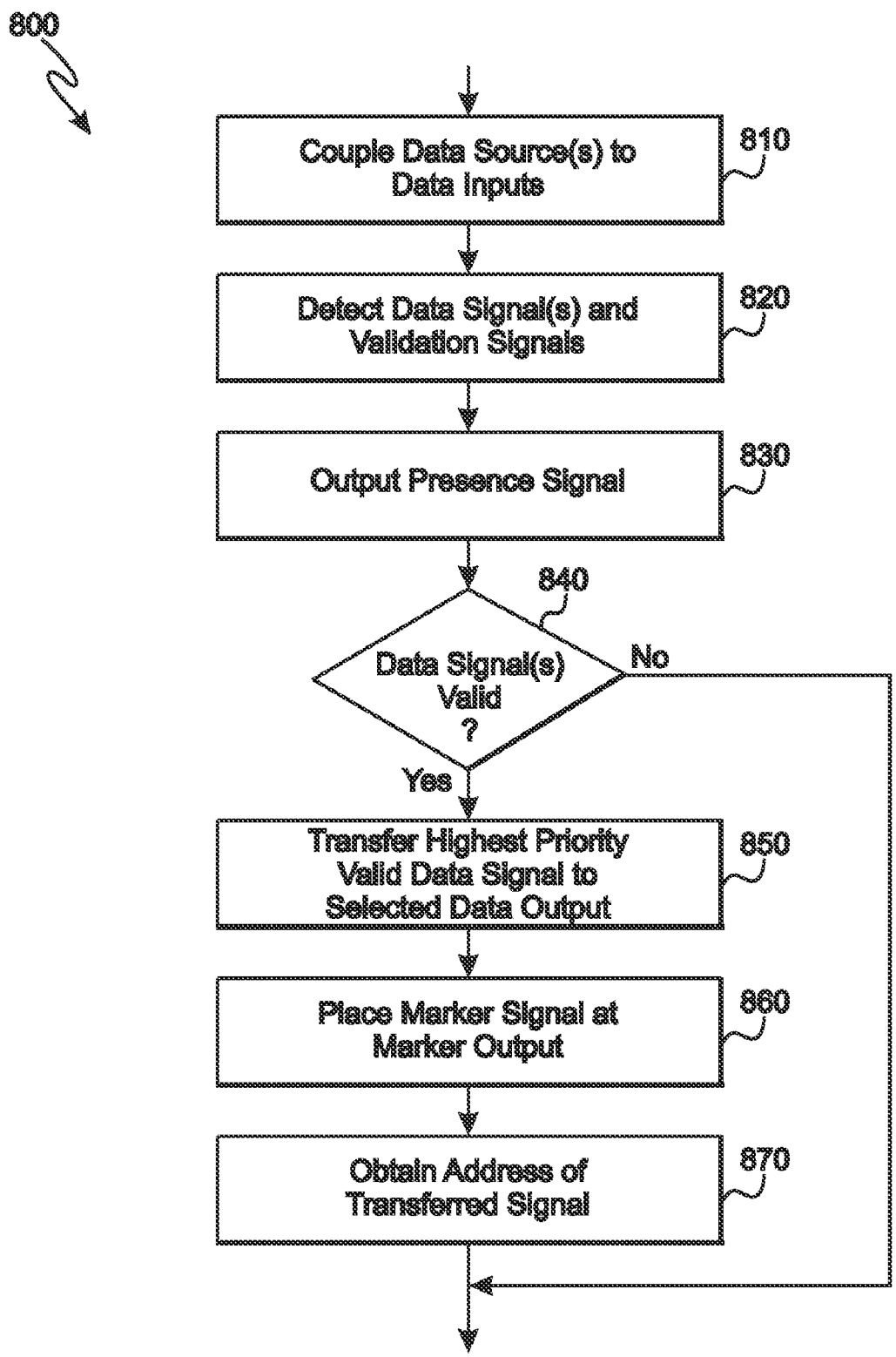
FIG. 8 is a flow chart of a method for selection of one data input from multiple data inputs as described in various representative embodiments.

FIG. 8 is a flow chart of a method 800 for selection of one data input from multiple data inputs as described in various representative embodiments. In block 810, at least one data source is coupled to a data selection circuit 100. Block 810 then transfers control to block 820.

In block 820, the various data signals and validation signals at respectively the data inputs and the validation inputs of the data selection circuit 100 are simultaneously detected. Block 820 then transfers control to block 830.

In block 830, presence signals P identifying whether or not at least one data signal inputted to the various selection modules 105 is valid are outputted at the appropriate presence outputs $O_P$. Block 830 then transfers control to block 840.

In block 840, if at least one data signal is identified as valid, block 840 transfers control to block 850. Otherwise, block 840 terminates the process, or alternatively block 840 could transfer control back to block 820.

In block 850, the valid data signal having the highest assigned priority is transferred to the selected data output of the data selection circuit 100. Block 850 then transfers control to block 860.

In block 860, marker signals M identifying from which data input of the various selection modules 105 the selected data signal transferred are outputted at the appropriate marker outputs $O_M$. Block 860 then transfers control to block 870.

In block 870, the address of the input signal transferred to the selected data output of the data selection circuit 100 is obtained. Block 870 terminates the process, or alternatively block 870 could transfer control back to block 820.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming an information-processing apparatus (e.g., the data selection circuit 100 comprising the elements shown in at least one of the Figures) to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

In the various representative embodiments, priority selection techniques have been disclosed for the selection of one data input from multiple valid data inputs based on a preselected priority scheme. These techniques simultaneously prioritize and select the data input. The presently disclosed techniques provide increased operational speed by simultaneously prioritizing and selecting the data input having the highest priority. Whereas, previous techniques perform these two functions serially, first obtaining a priority signal from the valid inputs and then using that signal to select the data input having the highest priority.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A circuit, comprising:
    a first selection module having a first data input, a second data input, a first validation input, a second validation input, a selected data output, a marker output, and a presence output, wherein a first validation signal received at the first validation input identifies whether or not a first data signal received at the first data input is valid, wherein a second validation signal received at the second validation input identifies whether or not a second data signal received at the second data input is valid, wherein a presence signal outputted at the presence output identifies whether or not at least one data signal is valid, wherein the first data input has an assigned selection priority higher than that assigned to the second data input, wherein if at least one data signal is identified as valid, the valid data signal having the higher assigned priority is transferred to the selected data output, and wherein a marker signal at the marker output identifies from which data input the transferred data signal is transferred.

2. The circuit as recited in claim 1, wherein the first selection module comprises:
    a switch having a first switch input coupled to the first data input, a second switch input coupled to the second data input, a switch output coupled to the selected data output, and a switch control input;
    a switch control module having a first switch-control-module input coupled to the first validation input, a second switch-control-module input coupled to the second validation input, and a switch-control-module output coupled to the switch control input and to the marker output; and a detection module having a first detection-module input coupled to the first validation input, a second detection-module input coupled to the second validation input, and a detection-module output coupled to the presence output, wherein the switch control module is configured to output the marker signal at the switch-control-module output dependent upon the first validation signal and the second validation signal, wherein the switch is configured to couple the switch output to the first switch input or to the second switch input, dependent upon the marker signal, and wherein the detection module is configured to output the presence signal at the detection-module output dependent upon the first validation signal and the second validation signal.

3. The circuit as recited in claim 1, wherein the first selection module comprises:

a selection multiplexer having a first selection-multiplexer input coupled to the first data input, a second selection-multiplexer input coupled to the second data input, a selection-multiplexer output coupled to the selected data output, and a selection-multiplexer control input;

a modified AND-gate having a first modified-AND-gate input coupled to the first validation input, a second modified-AND-gate input coupled to the second validation input, and a modified-AND-gate output coupled to the selection-multiplexer control input and to the marker output; and an OR-gate having a first OR-gate input coupled to the first validation input, a second OR-gate input coupled to the second validation input, and an OR-gate output coupled to the presence output, wherein the first selection module is configured for digital logic values for the first data signal, the second data signal, the first validation signal, the second validation signal, the selected signal, the marker signal, and the presence signal, wherein the logic value of the marker signal at the modified-AND-gate output is the logic AND of the logic value of the second validation signal and the complement of the logic value of the first validation signal, wherein if the marker signal is a logic "0", the selection multiplexer is configured to couple the first multiplexer input to the selection-multiplexer output, and wherein if the marker signal is a logic "1", the selection multiplexer is configured to couple the second multiplexer input to the selection-multiplexer output.

4. The circuit as recited in claim 3, further comprising:
a second selection module configured the same as the first selection module; and
a third selection module configured the same as the first selection module, wherein the selection-multiplexer output of the first selection module is coupled to the first selection-multiplexer input of the third selection module, wherein the selection-multiplexer output of the second selection module is coupled to the second selection-multiplexer input of the third selection module, wherein the OR-gate output of the first selection module is coupled to the first modified-AND-gate input of the third selection module, and wherein the OR-gate output of the second selection module is coupled to the second OR-gate input of the third selection module.

5. The circuit as recited in claim 4, further comprising:
an address module, comprising:
a first address multiplexer, having a first first-address-multiplexer input, a second first-address-multiplexer input, a first-address-multiplexer output, and a first-address-multiplexer control input, wherein the first first-address multiplexer input is coupled to the modified-AND-gate output of the first selection module, wherein the second first-address-multiplexer input is coupled to the modified-AND-gate output of the second selection module, wherein the first-address-multiplexer control input is coupled to the modified-AND-gate output of the third selection module, wherein the lower order bit of an input address is obtained from the first-address multiplexer output, and wherein the higher order bit of the input address is obtained from the modified-AND-gate output of the third selection module.

6. The circuit as recited in claim 3, further comprising:
a second selection module configured the same as the first selection module;
a third selection module configured the same as the first selection module, wherein the selection-multiplexer output of the first selection module is coupled to the first selection-multiplexer input of the third selection module, wherein the selection-multiplexer output of the second selection module is coupled to the second selection-multiplexer input of the third selection module, wherein the OR-gate output of the first selection module is coupled to the first modified-AND-gate input of the third selection module, and wherein the OR-gate output of the second selection module is coupled to the second OR-gate input of the third selection module;
a fourth selection module configured the same as the first selection module;
a fifth selection module configured the same as the first selection module;
a sixth selection module configured the same as the first selection module, wherein the selection-multiplexer output of the fourth selection module is coupled to the first selection-multiplexer input of the sixth selection module, wherein the selection-multiplexer output of the fifth selection module is coupled to the second selection-multiplexer input of the sixth selection module, wherein the OR-gate output of the fourth selection module is coupled to the first modified-AND-gate input of the sixth selection module, and wherein the OR-gate output of the fifth selection module is coupled to the second OR-gate input of the sixth selection module; and
a seventh selection module, wherein the selection-multiplexer output of the third selection module is coupled to the first selection-multiplexer input of the seventh selection module, wherein the selection-multiplexer output of the sixth selection module is coupled to the second selection-multiplexer input of the seventh selection module, wherein the OR-gate output of the third selection module is coupled to the first modified-AND-gate input of the seventh selection module, and wherein the OR-gate output of the sixth selection module is coupled to the second OR-gate input of the seventh selection module.

7. The circuit as recited in claim 6, further comprising:
an address module, comprising:
a first address multiplexer, having a first first-address-multiplexer input, a second first-address-multiplexer input, a first-address-multiplexer output, and a first-address-multiplexer control input, wherein the first first-address-multiplexer input is coupled to the modified-AND-gate output of the first selection module, wherein the second first-address-multiplexer input is coupled to the modified-AND-gate output of the second selection module, and wherein the first-address-multiplexer control input is coupled to the modified-AND-gate output of the third selection module;

a second address multiplexer, having a first second-address-multiplexer input, a second second-address-multiplexer input, a second-address-multiplexer output, and a second-address-multiplexer control input, wherein the first second-address-multiplexer input is coupled to the modified-AND-gate output of the fourth selection module, wherein the second second-address-multiplexer input is coupled to the modified-AND-gate output of the fifth selection module, and wherein the second-address-multiplexer control input is coupled to the modified-AND-gate output of the sixth selection module;

a third address multiplexer, having a first third-address-multiplexer input, a second third-address-multiplexer input, a third-address-multiplexer output, and a third-address-multiplexer control input, wherein the first third-address-multiplexer input is coupled to the first-address-multiplexer output, wherein the second third-address-multiplexer input is coupled to the second-address-multiplexer output, and wherein the third-address-multiplexer control input is coupled to the modified-AND-gate output of the seventh selection module; and a fourth address multiplexer, having a first fourth-address-multiplexer input, a second fourth-address-multiplexer input, a fourth-address-multiplexer output, and a fourth-address-multiplexer control input, wherein the first fourth-address-multiplexer input is coupled to the modified-AND-gate output of the third selection module, wherein the second fourth-address-multiplexer input is coupled to the modified-AND-gate output of the sixth selection module, wherein the fourth-address-multiplexer control input is coupled to the modified-AND-gate output of the seventh selection module, wherein the lowest order bit of an input address is obtained from the third-address-multiplexer output, wherein the next higher order bit of the input address is obtained from the fourth-address-multiplexer output, and wherein the highest order bit of the input address is obtained from the modified-AND-gate output of the seventh selection module.

8. The circuit as recited in claim 1, further comprising:
a second selection module configured the same as the first selection module; and
a third selection module configured the same as the first selection module, wherein the selected data output of the first selection module is coupled to the first data input of the third selection module, wherein the selected data output of the second selection module is coupled to the second data input of the third selection module, wherein the presence output of the first selection module is coupled to the first validation input of the third selection module, and wherein the presence output of the second selection module is coupled to the second validation input of the third selection module.

9. The circuit as recited in claim 8, further comprising:
an address module, comprising:
a first address multiplexer, having a first first-address-multiplexer input, a second first-address-multiplexer input, a first-address-multiplexer output, and a first-address-multiplexer control input, wherein the first first-address-multiplexer input is coupled to the marker output of the first selection module, wherein the second first-address-multiplexer input is coupled to the marker output of the second selection module, wherein the first-address-multiplexer control input is coupled to the marker output of the third selection module, wherein the lower order bit of an input address is obtained from the first-address multiplexer output, and wherein the higher order bit of the input address is obtained from the marker output of the third selection module.

10. The circuit as recited in claim 1, further comprising:
a second selection module configured the same as the first selection module;
a third selection module configured the same as the first selection module, wherein the selected data output of the first selection module is coupled to the first data input of the third selection module, wherein the selected data output of the second selection module is coupled to the second data input of the third selection module, wherein the presence output of the first selection module is coupled to the first validation input of the third selection module, and wherein the presence output of the second selection module is coupled to the second validation input of the third selection module;
a fourth selection module configured the same as the first selection module;
a fifth selection module configured the same as the first selection module;
a sixth selection module configured the same as the first selection module, wherein the selected data output of the fourth selection module is coupled to the first data input of the sixth selection module, wherein the selected data output of the fifth selection module is coupled to the second data input of the sixth selection module, wherein the presence output of the fourth selection module is coupled to the first validation input of the sixth selection module, and wherein the presence output of the fifth selection module is coupled to the second validation input of the sixth selection module; and
a seventh selection module, wherein the selected data output of the third selection module is coupled to the first data input of the seventh selection module, wherein the selected data output of the sixth selection module is coupled to the second data input of the seventh selection module, wherein the presence output of the third selection module is coupled to the first validation input of the seventh selection module, and wherein the presence output of the sixth selection module is coupled to the second validation input of the seventh selection module.

11. The circuit as recited in claim 10, further comprising:
an address module, comprising:
a first address multiplexer, having a first first-address-multiplexer input, a second first-address-multiplexer input, a first-address-multiplexer output, and a first-address-multiplexer control input, wherein the first first-address-multiplexer input is coupled to the marker output of the first selection module, wherein the second first-address-multiplexer input is coupled to the marker output of the second selection module, and wherein the first-address-multiplexer control input is coupled to the marker output of the third selection module;
a second address multiplexer, having a first second-address-multiplexer input, a second second-address-multiplexer input, a second-address-multiplexer output, and a second-address-multiplexer control input, wherein the first second-address-multiplexer input is coupled to the marker output of the fourth selection module, wherein the second second-address-multiplexer input is coupled to the marker output of the fifth selection module, and wherein the second-address-multiplexer control input is coupled to the marker output of the sixth selection module;

a third address multiplexer, having a first third-address-multiplexer input, a second third-address-multiplexer input, a third-address-multiplexer output, and a third-address-multiplexer control input, wherein the first third-address-multiplexer input is coupled to the first-address-multiplexer output, wherein the second third-address-multiplexer input is coupled to the second-address-multiplexer output, and wherein the third-address-multiplexer control input is coupled to the marker output of the seventh selection module; and a fourth address multiplexer, having a first fourth-address-multiplexer input, a second fourth-address-multiplexer input, a fourth-address-multiplexer output, and a fourth-address-multiplexer control input, wherein the first fourth-address-multiplexer input is coupled to the marker output of the third selection module, wherein the second fourth-address-multiplexer input is coupled to the marker output of the sixth selection module, wherein the fourth-address-multiplexer control input is coupled to the marker output of the seventh selection module, wherein the lowest order bit of an input address is obtained from the third-address multiplexer output, wherein the next higher order bit of the input address is obtained from the fourth-address-multiplexer output, and wherein the highest order bit of the input address is obtained from the marker output of the seventh selection module.

12. A method for selection of one data input from a multiple of data inputs, comprising:

coupling at least one data source to a circuit, comprising:
a first selection module, wherein the first selection module has a first data input, a second data input, a first validation input, a second validation input, a selected data output, a marker output, and a presence output;

detecting a first data signal at the first data input;

simultaneously with the step detecting the first data signal, detecting a second data signal at the second data input;

simultaneously with the step detecting the first data signal, detecting a first validation signal at the first validation input;

simultaneously with the step detecting the first data signal, detecting a second validation signal at the second validation input, wherein the first validation signal identifies whether or not the detected first data signal is valid and wherein the second validation signal identifies whether or not the detected second data signal is valid;

outputting a presence signal at the presence output, wherein the presence signal identifies whether or not at least one data signal is valid and wherein the first data input has an assigned selection priority higher than that assigned to the second data input;

if at least one data signal is identified as valid, transferring the valid data signal having the higher assigned priority to the selected data output; and placing a marker signal at the marker output, wherein the marker signal identifies from which data input the transferred data signal was transferred.

13. The method as recited in claim 12, further comprising:
including a second selection module and a third selection module in the circuit to which at least one of the data sources is coupled, wherein the second and the third selection modules are configured the same as the first selection module, wherein the selected data output of the first selection module is coupled to the first data input of the third selection module, wherein the selected data output of the second selection module is coupled to the second data input of the third selection module, wherein the presence output of the first selection module is coupled to the first validation input of the third selection module, and wherein the presence output of the second selection module is coupled to the second validation input of the third selection module;

simultaneously with the step detecting the first data signal at the first data input of the first selection module, detecting additional data signals at first and second data inputs of the second selection module;

simultaneously with the step detecting the first data signal at the first data input of the first selection module, detecting validation signals at first and second validation inputs, of the second selection module;

outputting respective presence signals at the presence output of the second selection module and at the presence output of the third selection module; and if at least one data signal at the data inputs of the first and the second selection modules is identified as valid, transferring the valid data signal having the highest assigned priority to the selected data output of the third selection module.

14. The method as recited in claim 13, further comprising:
identifying the data input of the valid data signal having the highest assigned priority transferred to the selected data output of the third selection module from the marker output of the first selection module, the marker output of the second selection module, and the marker output of the third selection module.

15. The method as recited in claim 13, further comprising:
including a fourth selection module, a fifth selection module, a sixth selection module, and a seventh selection module in the circuit to which at least one of the data sources is coupled, wherein the fourth, the fifth, the sixth, and the seventh selection modules are configured the same as the first selection module, wherein the selected data output of the fourth selection module is coupled to the first data input of the sixth selection module, wherein the selected data output of the fifth selection module is coupled to the second data input of the sixth selection module, wherein the presence output of the fourth selection module is coupled to the first validation input of the sixth selection module, wherein the presence output of the fifth selection module is coupled to the second validation input of the sixth selection module, wherein the selected data output of the third selection module is coupled to the first data input of the seventh selection module, wherein the selected data output of the sixth selection module is coupled to the second data input of the seventh selection module, wherein the presence output of the third selection module is coupled to the first validation input of the seventh selection module, and wherein the presence output of the sixth selection module is coupled to the second validation input of the seventh selection module;

simultaneously with the step detecting the first data signal at the first data input of the first selection module, detecting additional data signals at first and second data inputs of the fourth and the fifth selection modules;

simultaneously with the step detecting the first data signal at the first data input of the first selection module, detecting validation signals at first and second validation inputs, of the fourth and the fifth selection modules;

outputting respective presence signals at the presence output of the fourth selection module, at the presence output of the fifth selection module, at the presence output of the sixth selection module, and at the presence output of the seventh selection module; and if at least one data signal at the data inputs of the first, the second, the fourth, and the fifth selection modules is identified as valid, transferring the valid data signal having the highest assigned priority to the selected data output of the seventh selection module.

16. The method as recited in claim 15, further comprising:

identifying the data input of the valid data signal having the highest assigned priority transferred to the selected data output of the seventh selection module from the marker output of the first selection module, the marker output of the second selection module, the marker output of the third selection module, the marker output of the fourth selection module, the marker output of the fifth selection module, the marker output of the sixth selection module, and the marker output of the seventh selection module.

17. A circuit, comprising:

means for coupling at least one data source to the circuit;

means for simultaneously detecting a first data signal, a second data signal, a first validation signal, and a second validation signal, wherein the first validation signal identifies whether or not the detected first data signal is valid and wherein the second validation signal identifies whether or not the detected second data signal is valid;

means for outputting a presence signal, wherein the presence signal identifies whether or not at least one data signal is valid and wherein the first data signal input has an assigned selection priority higher than that assigned to the second data signal;

means for transferring the valid data signal having the higher assigned priority to a selected data output if at least one data signal is identified as valid; and means for providing a marker signal at a marker output, wherein the marker signal identifies from which data input the transferred data signal was transferred.

* * * * *